(12) United States Patent
Lake et al.

(10) Patent No.: US 11,175,476 B2
(45) Date of Patent: Nov. 16, 2021

(54) ADJUSTABLE MIRROR ASSEMBLY FOR A BOAT

(71) Applicants: MasterCraft Boat Company, LLC, Vonore, TN (US); Gere Marie Corporation, Lake Zurich, IL (US)

(72) Inventors: Ryan D. Lake, Madisonville, TN (US); James G. Schultz, Lake Zurich, IL (US); Gregory A. Mackall, Wauconda, IL (US)

(73) Assignees: MasterCraft Boat Company, LLC, Vonore, TN (US); Gere Marie Corporation, Lake Zurich, IL (US)

( * ) Notice: Subject to any disclaimer, the term of this patent is extended or adjusted under 35 U.S.C. 154(b) by 196 days.

(21) Appl. No.: 16/402,376

(22) Filed: May 3, 2019

(65) Prior Publication Data

US 2019/0339484 A1     Nov. 7, 2019

Related U.S. Application Data

(60) Provisional application No. 62/667,394, filed on May 4, 2018.

(51) Int. Cl.
*G02B 7/198* (2021.01)
*B60R 1/06* (2006.01)

(52) U.S. Cl.
CPC .............. *G02B 7/198* (2013.01); *B60R 1/06* (2013.01); *B60Y 2200/80* (2013.01)

(58) Field of Classification Search
CPC ........... B60R 1/074; B60R 1/06; B60R 1/076; B60R 1/078; B60R 1/0605; B60R 1/072; B60R 1/1207; B60R 1/0617; B60R 1/12; B60R 1/04; B60R 1/081; B60R 1/082; B60R 2001/1253; B60R 1/008;
(Continued)

(56) References Cited

U.S. PATENT DOCUMENTS

| 2,353,380 | A | * | 7/1944 | Adler, Jr. ................ B64C 25/28 359/841 |
| 5,100,093 | A | | 3/1992 | Rawlinson |

(Continued)

FOREIGN PATENT DOCUMENTS

GB         2541224 A      2/2017

OTHER PUBLICATIONS

Indy, Boat Mirror for Bimini Top | Large Boat Mirror, available at: http://www.indywakeboardtowers.com/product/bimini-top-mirror/ (last visited Jan. 30, 2018).
(Continued)

*Primary Examiner* — William R Alexander
*Assistant Examiner* — Sharrief I Broome
(74) *Attorney, Agent, or Firm* — Venable LLP

(57) ABSTRACT

An adjustable mirror assembly includes a mirror having a reflective surface. The adjustable mirror assembly may include a first locking mechanism configured to lock a support in a finite number of discrete positions. The support may be movable between a lowered position and a raised position. The mirror may be pivotally mounted to the support and may be configured to pivot about a second pivot axis to orient the reflective surface of the mirror in an aft-facing direction in both the lowered position and the raised position.

23 Claims, 15 Drawing Sheets

(58) Field of Classification Search
CPC .......... B60R 1/07; B60R 11/04; B60R 1/002; B60R 1/0612; B60R 1/062; B60R 2001/1215; G02B 7/182; G02B 7/198; G02B 19/0023; G02B 19/0047; G02B 2027/0118; G02B 2027/012; G02B 27/14; G02B 5/10; G02B 6/00; G11B 5/4826; G11B 5/5552; G11B 5/56; G11B 5/596
See application file for complete search history.

(56) References Cited

U.S. PATENT DOCUMENTS

| | | | |
|---|---|---|---|
| 5,259,582 A | 11/1993 | DeLange, III | |
| 5,455,716 A | 10/1995 | Suman et al. | |
| 5,566,030 A * | 10/1996 | Yue | A45D 42/00 248/467 |
| 5,964,443 A * | 10/1999 | Leveille | B60R 1/06 248/292.12 |
| D472,504 S | 4/2003 | Leveille | |
| D478,537 S | 8/2003 | Ono | |
| D488,425 S | 4/2004 | Schultz | |
| D514,500 S | 2/2006 | Schultz | |
| 7,007,904 B2 | 3/2006 | Schultz | |
| 7,028,959 B2 | 4/2006 | Schultz | |
| 7,232,100 B2 | 6/2007 | Schultz | |
| D549,968 S | 9/2007 | Pitot et al. | |
| 8,434,812 B2 | 5/2013 | Li et al. | |
| D709,011 S | 7/2014 | Bohanan et al. | |
| 8,770,530 B2 | 7/2014 | Bohanan et al. | |
| D712,325 S | 9/2014 | Bohanan et al. | |
| D724,508 S | 3/2015 | Bohanan et al. | |
| D724,509 S | 3/2015 | Bohanan et al. | |
| D730,255 S | 5/2015 | Roth | |
| D730,792 S | 6/2015 | Roth | |
| D761,169 S | 7/2016 | Roth | |
| D761,708 S | 7/2016 | Hamlin et al. | |
| 9,421,911 B2 | 8/2016 | Favila et al. | |
| 2004/0232294 A1* | 11/2004 | Schultz | B63B 17/00 248/230.1 |
| 2004/0232295 A1 | 11/2004 | Schultz | |
| 2014/0085739 A1* | 3/2014 | Bohanan | G02B 7/198 359/841 |
| 2018/0001822 A1 | 1/2018 | Bohanan et al. | |

OTHER PUBLICATIONS

Overton's, CIPA Comp Mirror With Windshield Mount, available at https://www.overtons.com/modperl/product/details.cgi?pdesc=CIPA-Comp-Mirror-With-Windshield-Mount&i=110004#2 (last visited Jan. 30, 2018).
SEADOO Sportboats.com, 2012 Sea Doo 230 WAKE Boat Details Mirror, available at http://seadoosportboats.com/gallery/image/1899-2012-sea-doo-230-wake-boat-details-mirror/ (last visited Jan. 30, 2018).
Aerial Wakesports Products, Wakeboard Tower Mirror by Aerial | Adjustable Arm w/ Quick Release | Polished Aluminum, available at https://www.aerialwakeboarding.com/wakeboard-tower-mirror-p/bt-mirkitadju-pa.htm (last visited Jan. 30, 2018).
PTM Edge Watersports by Promonet, UCX 17 Pro Mirror—PTM Edge—Pontoon Boat Mirrors, available at https://ptmedge.com/ucx-17-pro/ (last visited Oct. 11, 2017).

* cited by examiner

ADJUSTABLE MIRROR ASSEMBLY FOR A BOAT

CROSS-REFERENCE TO RELATED APPLICATION

This application claims the benefit under 35 U.S.C. § 119(e) of U.S. Provisional Patent Application No. 62/667,394, filed May 4, 2018, and titled "Adjustable Mirror Assembly for a Boat." The foregoing application is hereby incorporated by reference in its entirety and is made a part of this specification for all that it discloses.

FIELD OF THE INVENTION

This invention relates to a mirror assembly for a boat, in particular, an adjustable, aft-facing mirror assembly.

BACKGROUND OF THE INVENTION

Boats are used to tow watersports participants, such as water skiers, wakeboarders, and the like, using a tow-line. The participant holds onto one end of the tow-line and the other end is attached to the boat. A boat may also be used to generate a wake on which a watersports participant, such as a wake surfer, may wake surf. The boat is operated by a driver (or operator) at a control console to move the boat through the water for watersports such as these. When the boat is underway (or driven) the driver needs to look forward to operate the boat, keeping it on course and avoiding navigational hazards such as other vessels or submerged or partially-submerged objects. But maintaining awareness of the boat operator's surroundings requires being aware of what is going on behind the boat as well, particularly when a watersports participant is behind the boat. Mirrors have been mounted near the control console to provide the driver with visibility behind the boat, and in some states, aft-facing mirrors are required for watersports in the absence of a spotter in the boat. Easily adjustable and versatile mirrors are thus desired for use on the boat.

SUMMARY OF THE INVENTION

One aspect of the invention relates to a boat with an adjustable mirror assembly. The boat includes a hull, a windshield, and an adjustable mirror assembly. The hull has a port side and a starboard side. The windshield has an upper edge, and at least a part of the windshield is oriented in a transverse direction of the boat. The adjustable mirror assembly is mounted to the windshield and includes a support and a mirror having a reflective surface. The support is movable about a first pivot axis between a lowered position and a raised position. The mirror is pivotally mounted to the support and configured to pivot about a second pivot axis to orient the reflective surface of the mirror in an aft-facing direction in both the lowered position and the raised position. In the lowered position, the mirror is located lower than the upper edge of the windshield, aft of the windshield, and between a port-most portion of the windshield and a starboard-most portion of the windshield. In the raised position, the mirror is located higher than the upper edge of the windshield.

Another aspect of the invention relates to a boat with an adjustable mirror assembly. The boat includes a hull, a windshield, and an adjustable mirror assembly. The hull has a port side and a starboard side. The windshield has an upper edge, and at least a part of the windshield is oriented in a transverse direction of the boat. The adjustable mirror assembly includes a support movable about a first pivot axis, a first locking mechanism configured to lock the support in a finite number of discrete positions, and a mirror having a reflective surface.

These and other aspects of the invention will become apparent from the following disclosure.

DETAILED DESCRIPTION OF THE PREFERRED EMBODIMENTS

As used herein, directional terms forward (fore), aft, inboard, and outboard have their commonly understood meaning in the art. Relative to the boat, forward is a direction toward the bow, and aft is a direction toward the stern. Likewise, inboard is a direction toward the center of the boat and outboard is a direction away from it.

Figure 1:
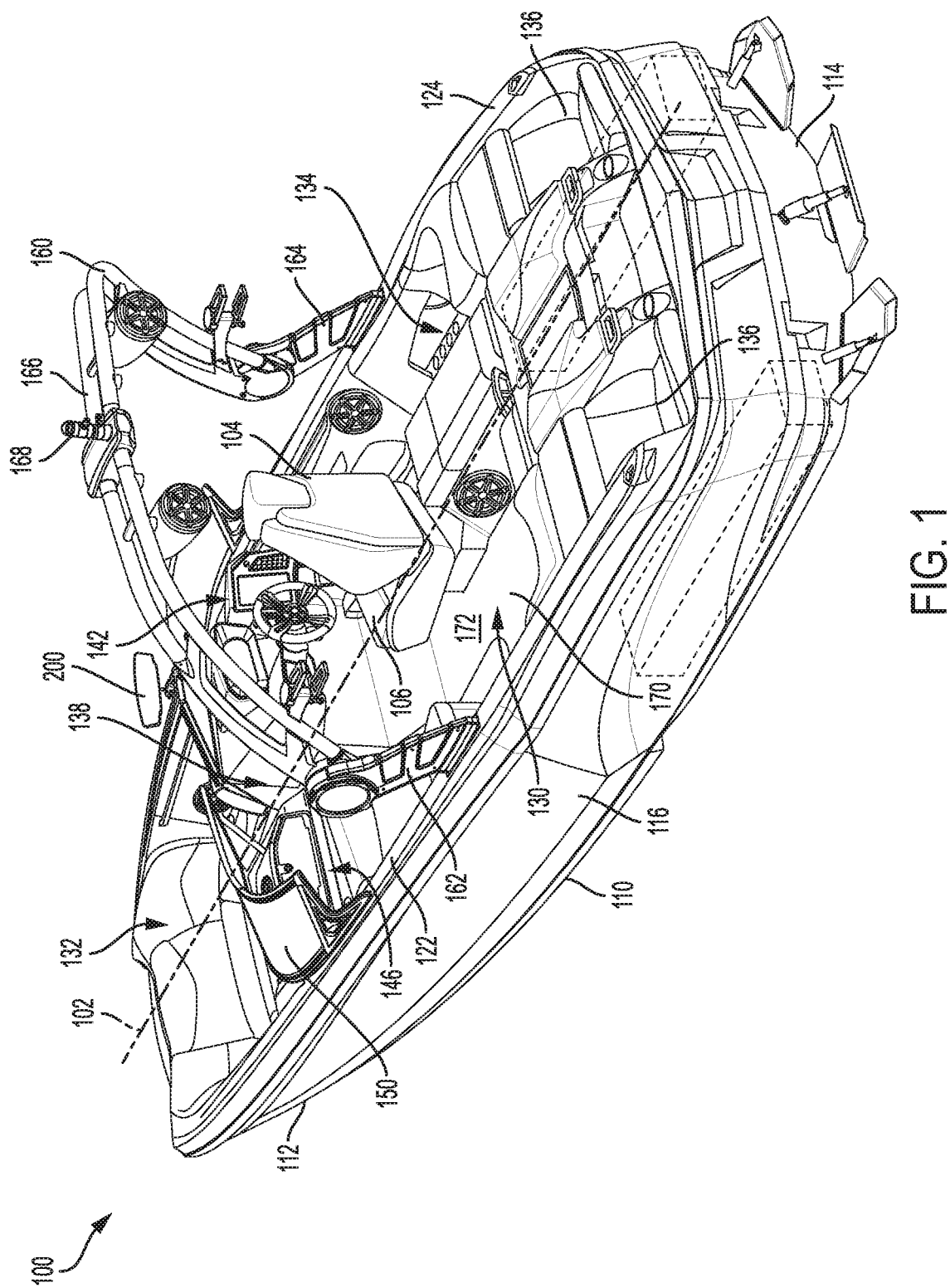
FIG. 1 shows a boat that may be used with an adjustable mirror assembly according to preferred embodiment of the invention.
Figure 2:
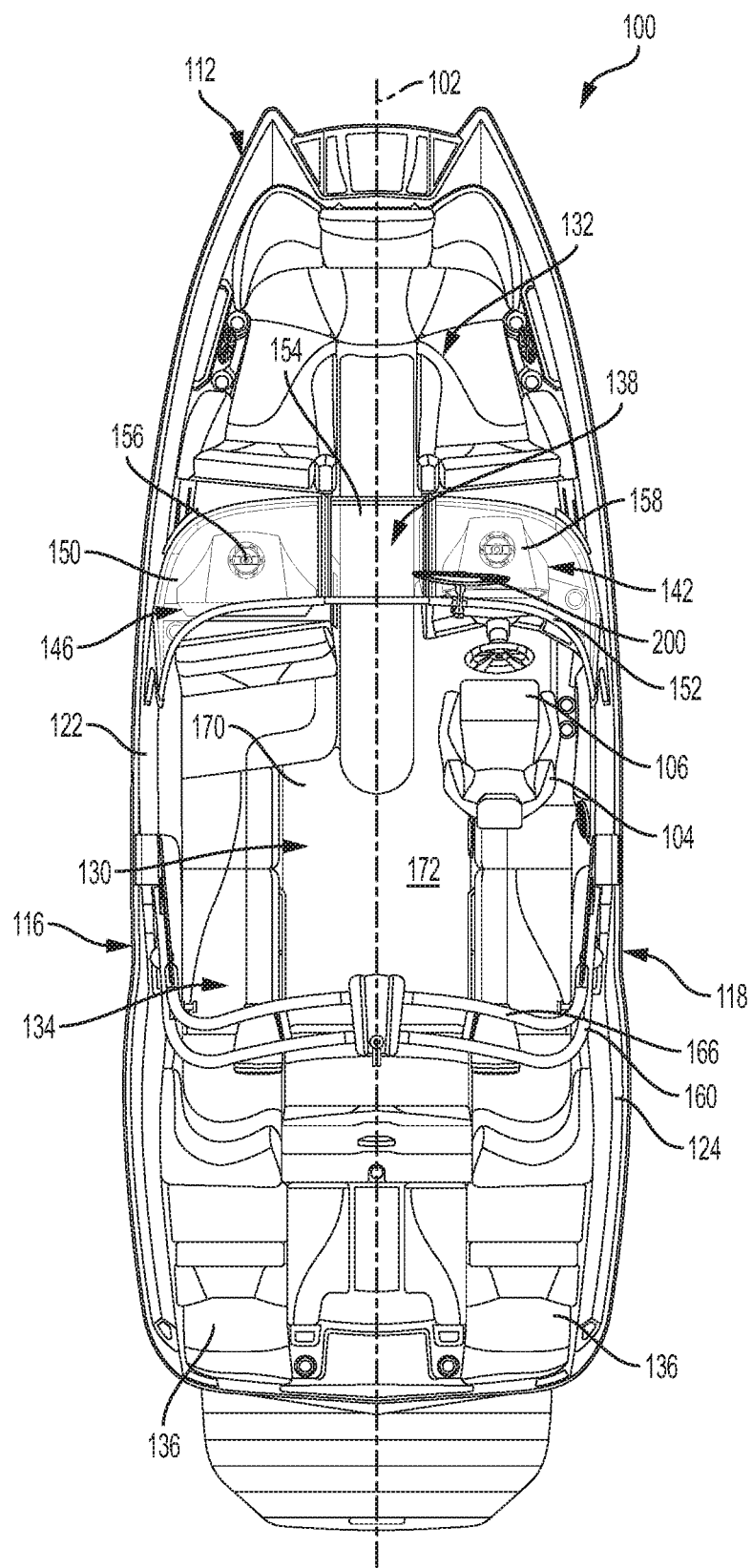
FIG. 2 is a top view of the boat shown in FIG. 1.

FIGS. 1 and 2 show a boat 100 that may be used with an adjustable mirror assembly 200 in accordance with an exemplary preferred embodiment of the invention. The adjustable mirror assembly 200 is shown with the boat 100 in FIG. 3 and in more detail in FIGS. 5-21, as will be discussed further below. As shown in FIGS. 1 and 2, the boat 100 includes a hull 110 with a bow 112, a transom 114, a port side 116, and a starboard side 118. The port and starboard sides 116, 118 have port and starboard gunwales 122, 124, respectively. The boat 100 has a centerline 102 running down the middle of the boat 100, halfway between the port and starboard sides 116, 118. Collectively, the bow 112, the transom 114, and the port and starboard sides 116, 118 define an interior 130 of the boat 100.

In the embodiment shown in FIGS. 1 and 2, the boat 100 is a bowrider having both a bow seating area 132 positioned in the bow 112 of the boat 100 and a primary seating area 134 (sometimes also referred to as the cockpit) positioned aft of a windshield 150. The boat 100 shown in FIGS. 1 and 2 also has a pair of aft-facing seats 136, such as those described in U.S. Pat. No. 9,650,117, which is incorporated by reference herein in its entirety. Also within the boat's interior 130 is a control console 142 for operating the boat 100. Here, the control console 142 is positioned on the starboard side of the boat 100 proximate to and aft of the windshield 150. The boat 100 is moved through the water by a single inboard motor (not shown) connected to a propeller (not shown) by a drive shaft (not shown). However, this invention can be utilized with other types of boats and propulsion systems, including but not limited to outboard motors, sterndrives, and the like. Although described in reference to a bowrider, this invention may be used with any suitable boat including cuddies, center consoles, and cruisers, for example. The invention also is not limited to boats with single decks, but also may be used with boats that have multiple decks, such as boats having a flybridge.

The boat 100 also is equipped with an apparatus for towing a watersports participant. As shown in FIGS. 1 and 2, the towing apparatus is a tower 160 that is particularly used for towing a wakeboarder. Any suitable tower 160 may be used including, for example, those described in U.S. Pat. Nos. 9,580,155 and 10,150,540, which are incorporated by reference herein in their entireties. The tower 160 includes two legs: a port leg 162 and a starboard leg 164. The port leg 162 is attached on the port side of the centerline 102 of the boat 100, and the starboard leg 164 is attached on the starboard side of the centerline 102 of the boat 100. Preferably, the port and starboard legs 162, 164 are attached to the port gunwale 122 and the starboard gunwale 124, respectively. The tower 160 also includes a header 166. The header 166 is connected to an upper portion of each of the two legs 162, 164 and spans the interior 130 of the boat 100 at a height suitable for passengers to pass underneath while standing. In addition, the tower 160 has a tow-line-attachment structure 168 at an upper portion of the tower 160 (the header 166 in this embodiment). This tow-line-attachment structure 168 may be used to connect a tow-line suitable for towing a watersports participant, such as a wakeboarder. Any suitable tow-line-attachment structure 168 may be used, including but not limited to the integrated light and tow-line-attachment assembly disclosed in U.S. Pat. No. 6,539,886, which is incorporated by reference herein in its entirety.

The boat 100 has a deck 170 which includes a floor 172. The deck 170 also includes two support structures 176, 178 (elevated portions of the deck), one on the starboard side 176 of the boat 100 and one on the port side 178 of the boat 100. As shown in more detail in FIG. 3, the support structure on the starboard side 176 is the control console support and is used to support and enclose various controls for operating the boat 100 (discussed further below). As shown in more detail in FIG. 4, the support structure 178 on the port side of the boat 100 supports a passenger-side console 146. The support structure 178 on the port side of the boat 100 is opposite the control console support 176. Together the two support structures 176, 178 separate the bow seating area 132 from the primary seating area 134, as seen in FIG. 2. A walkway 138 connects the bow seating area 132 with the primary seating area 134 and separates the two support structures 176, 178.

Figure 3:
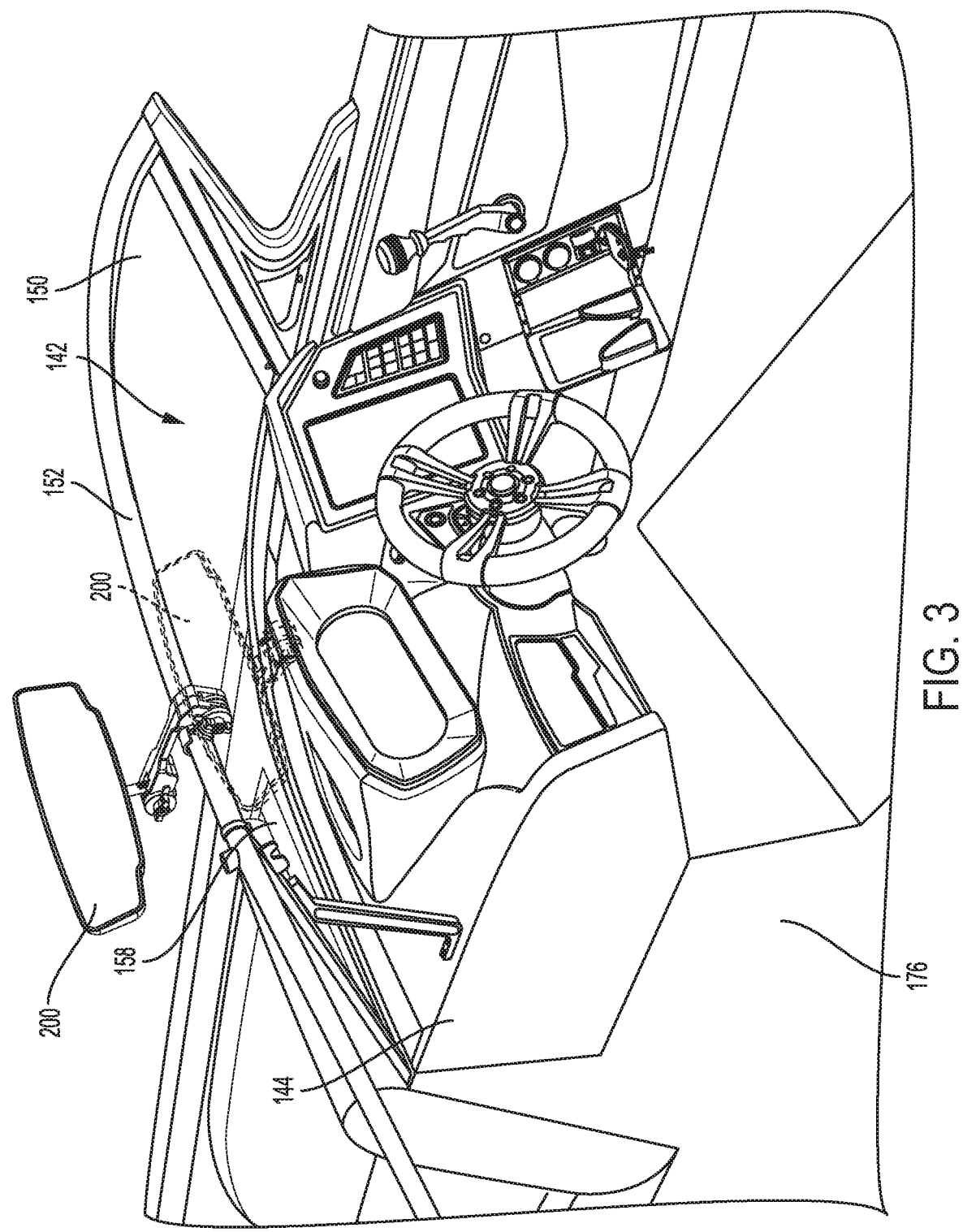
FIG. 3 is a perspective view of the control console of the boat shown in FIG. 1 with an adjustable mirror assembly according to a preferred embodiment of the invention mounted on the windshield above the control console.
Figure 4:
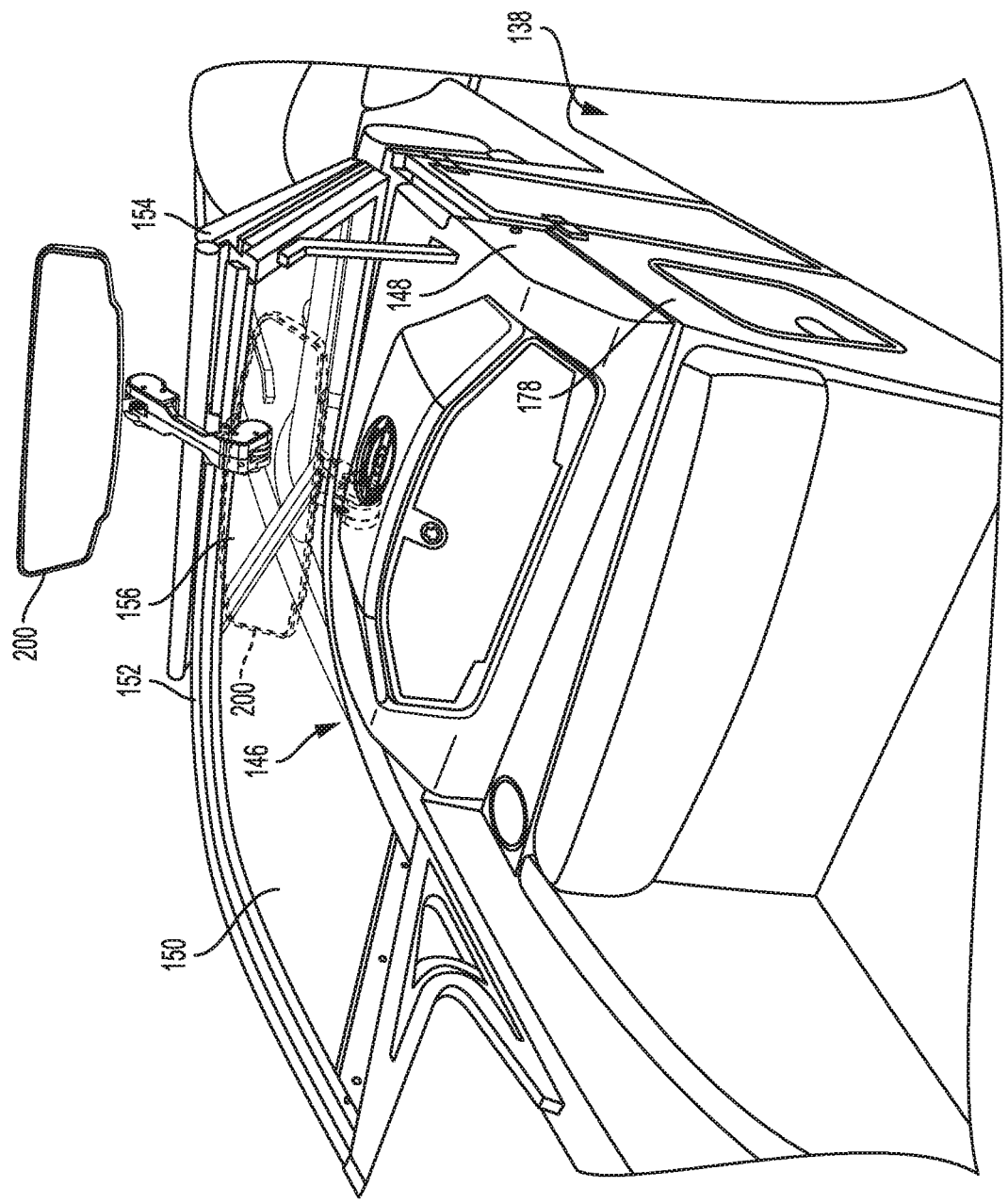
FIG. 4 is a perspective view of the passenger-side console of the boat shown in FIG. 1 with an adjustable mirror assembly according to a preferred embodiment of the invention mounted on the windshield above the passenger-side console.

A detailed view of the control console 142 is shown in FIG. 3. A dash 144 houses instrumentation, displays, and controls for the boat 100. The dash 144 is supported by the control console support 176 and is positioned proximate the windshield 150. To operate the boat 100, the driver stands at the control console 142, or is seated in a driver seat 104 (see FIG. 1). The driver seat 104 may have a driver seat booster 106 that can be rotated up to provide a raised seating position for the boat operator. A detailed view of the passenger-side console 146 is shown in FIG. 4, and like the control console 142, the passenger-side console 146 also includes a dash 148 that is positioned proximate the windshield 150.

The windshield 150 is mounted, in part, on forward portions of the support structures 174, 176. In this embodiment, the windshield 150 is mounted directly to a forward portion of the support structures 174, 176 and the gunwales 122, 124. Near the walkway 138 or centerline 102 of the boat 100, the windshield 150 is oriented in a transverse direction of the boat 100. In this embodiment, this portion of the windshield 150 is perpendicular to the centerline 102 of the boat 100. Moving outboard from the centerline 102 of the boat 100, the windshield 150 is curved such that it smoothly transitions to an orientation that is parallel to or co-planar with the port or starboard side of the hull 116, 118 near the gunwales 122, 124, which in this embodiment is generally parallel to the centerline 102 of the boat 100.

The windshield 150 extends upward from a generally horizontal upper surface of the dash 144, 148 and, in this embodiment, from the control console support 176 or the passenger-side support 178, to which the windshield 150 is mounted. The windshield 150 extends upward from the supports 176, 178 to an upper edge 152 of the windshield 150. The windshield 150 is slanted with respect to the floor 172 (or a generally horizontal upper surface of the dash 144) and extends in an aft-ward direction. In this embodiment, the windshield 150 is inclined at a non-zero angle with respect to the floor 172 (or the generally horizontal upper surface of the dash 144). Preferably the windshield 150 is slanted between 30 degrees and 45 degrees. As a result of the slant, the windshield 150 extends over the dashes 144, 148, and the upper edge 152 of the windshield 150 is located above and aft of the location on the supports 176, 178 to which the windshield 150 is attached.

Figure 22:
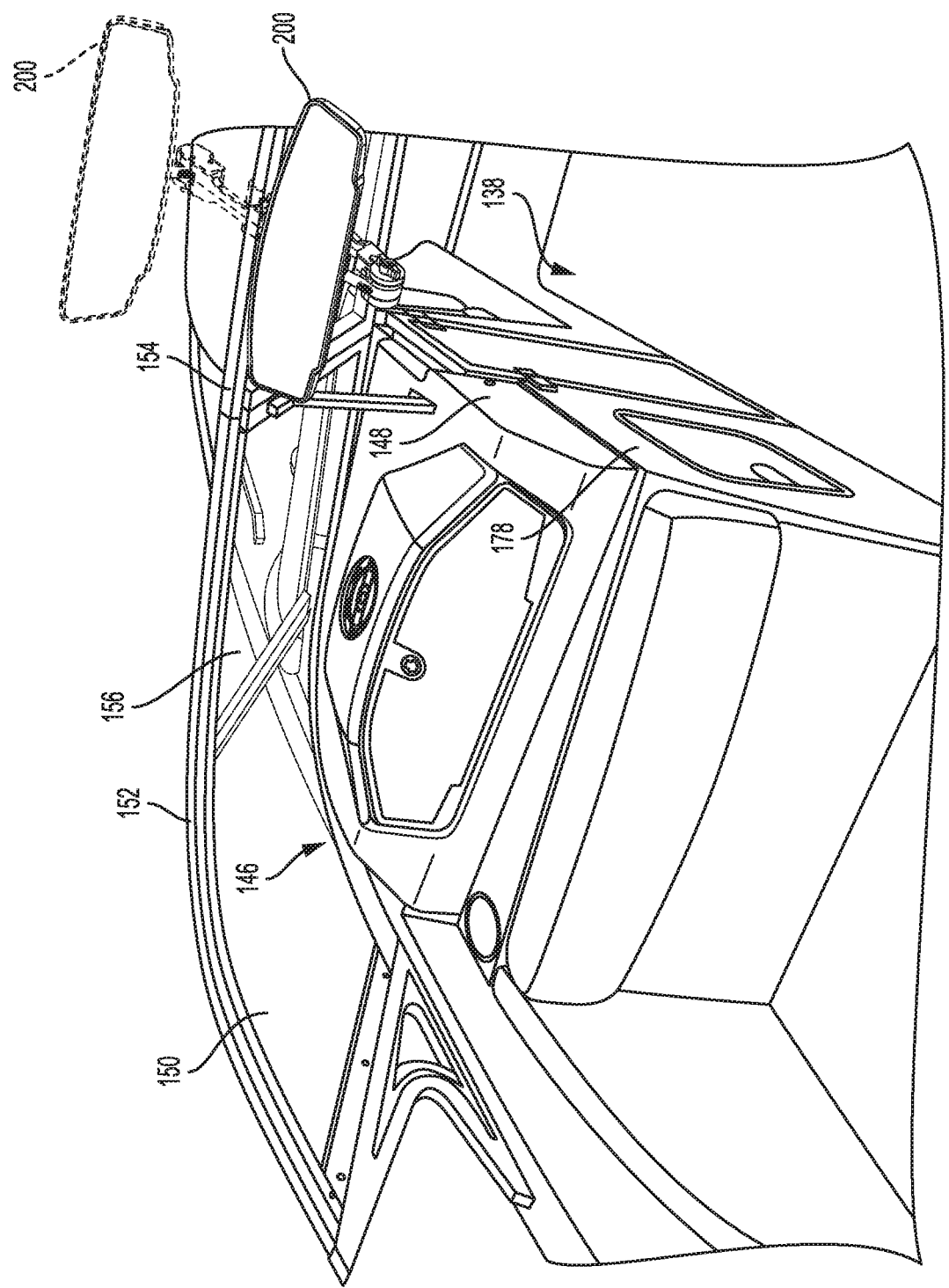
FIG. 22 is a perspective view of the passenger-side console of the boat shown in FIG. 1 with the adjustable mirror assembly mounted on a walk-through door of the windshield and the walk-through door in a closed position.
Figure 23:
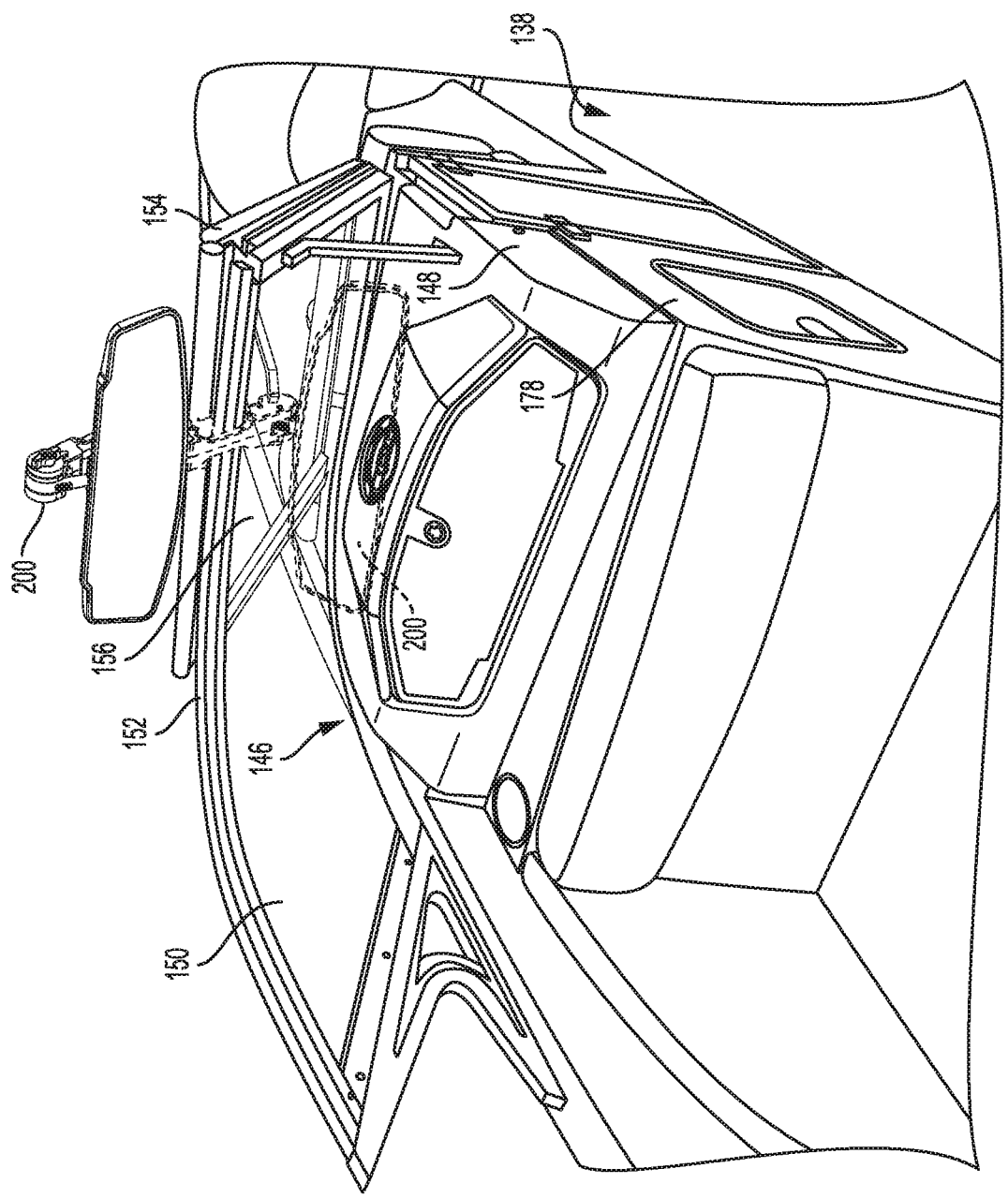
FIG. 23 is a perspective view of the passenger-side console of the boat shown in FIG. 1 with the adjustable mirror assembly mounted on a walk-through door of the windshield and the walk-through door in an open position.

The windshield 150 of this embodiment includes a walk-through door 154. The walk-through door 154 separates the windshield 150 into a port-side portion 156 and a starboard-side portion 158. The port-side portion 156 is located over the passenger-side console 146, and the starboard-side portion 158 is located over the control console 142. The walk-through door 154 is movable between a closed position and an open position. The walk-through door 154 is shown in the closed position in FIGS. 2 and 22, in which it spans the walkway 138. Hinges located between the port-side portion 156 of the windshield 150 and the walk-through door 154 allow the walk-through door 154 to be moved to the open position (as shown in FIGS. 4 and 23), in which the walk-through door 154 is located on the forward side of the port-side portion 156 of the windshield 150. With the walk-through door 154 in the open position, a person can use the walkway 138 to move between the bow seating area 132 and the primary seating area 134.

The adjustable mirror assembly 200 according to a preferred embodiment of the invention is particularly suited for mounting on the windshield 150, and preferably to a top or upper portion of the windshield 150. In this embodiment, the adjustable mirror assembly 200 is mounted to the upper edge 152 of the windshield 150. As shown in FIGS. 3 and 9-16, the adjustable mirror assembly 200 is preferably located on the starboard-side portion 158 of the windshield 150 above the control console 142. The adjustable mirror assembly 200 may, however, be suitably mounted to other portions of the windshield 150, such as the port-side portion 156 (see FIG. 4) or even the walk-through door 154 (see FIGS. 22 and 23), and the description of the adjustable mirror assembly 200 on the starboard-side portion 158 of the windshield 150 also applies to these other positions.

Figure 5:
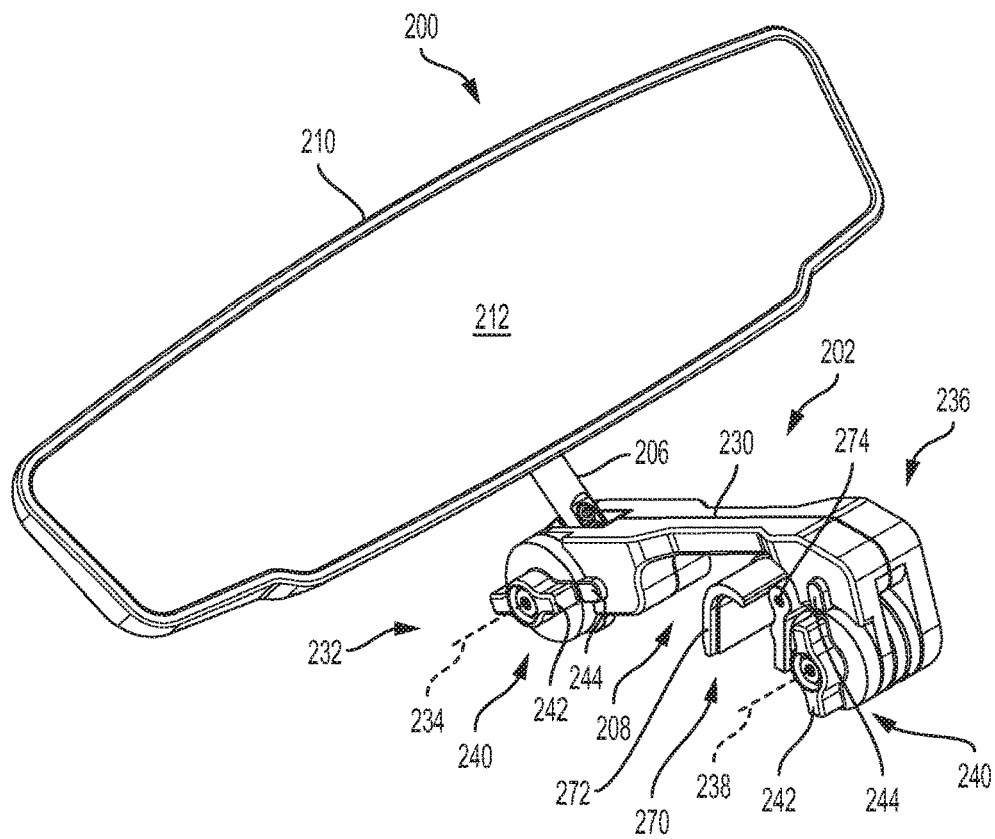
FIG. 5 is a perspective view of the aft side of an adjustable mirror assembly according to a preferred embodiment of the invention.
Figure 6:
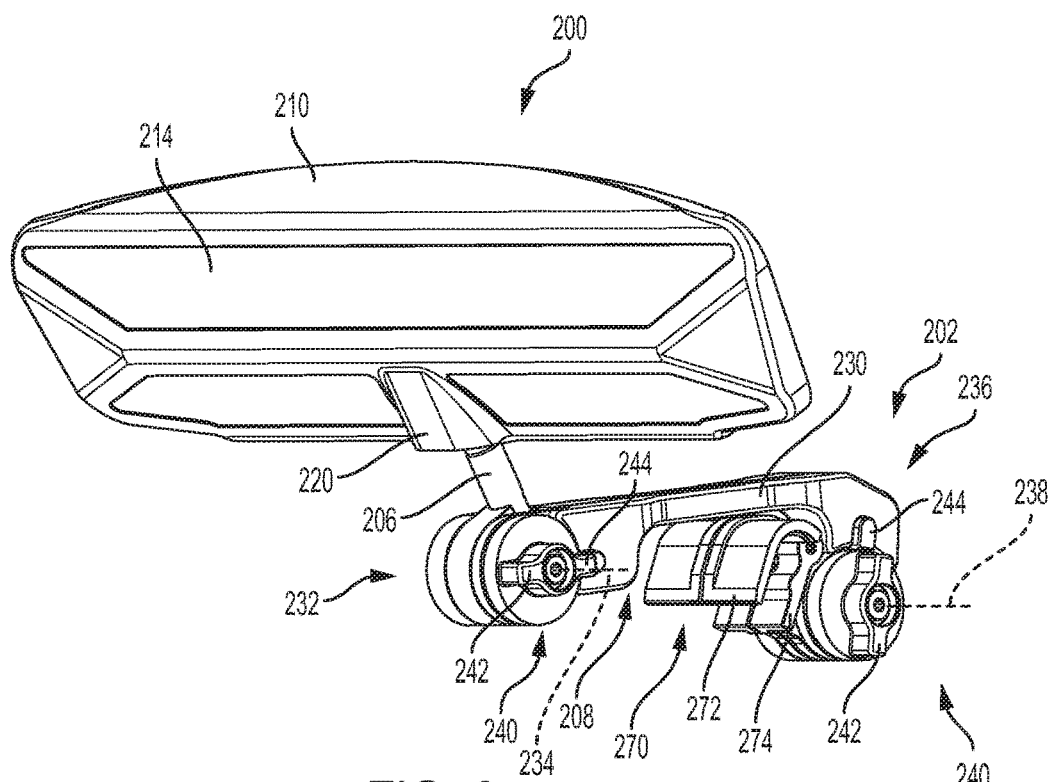
FIG. 6 is a perspective view of the forward side of the adjustable mirror assembly shown in FIG. 5.
Figure 7:
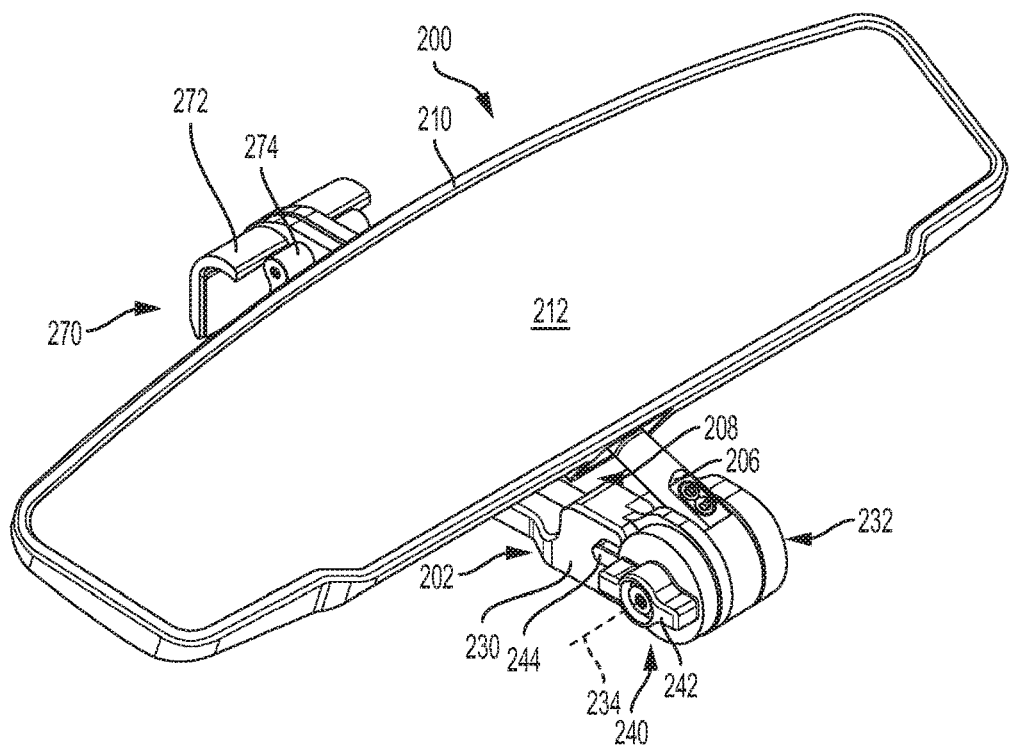
FIG. 7 is perspective view of the aft side of the adjustable mirror assembly shown in FIG. 5 in an alternate position.
Figure 8:
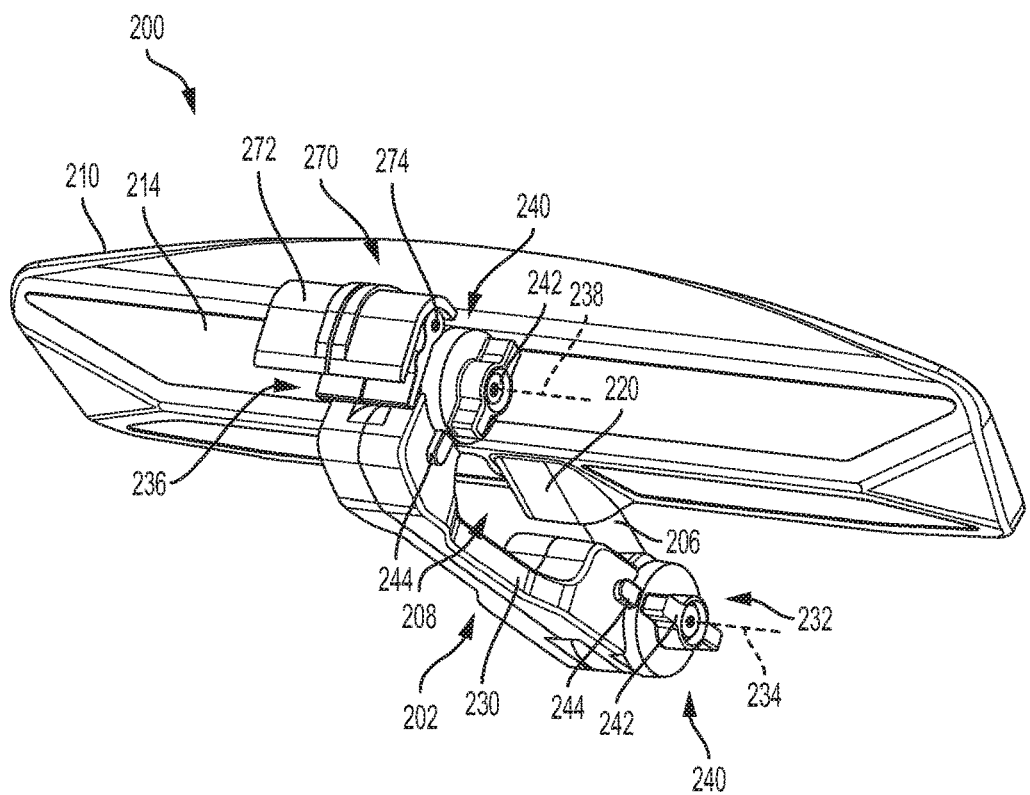
FIG. 8 is a perspective view of the forward side of the adjustable mirror assembly shown in FIG. 5 in the alternate position shown in FIG. 7.
Figure 9:
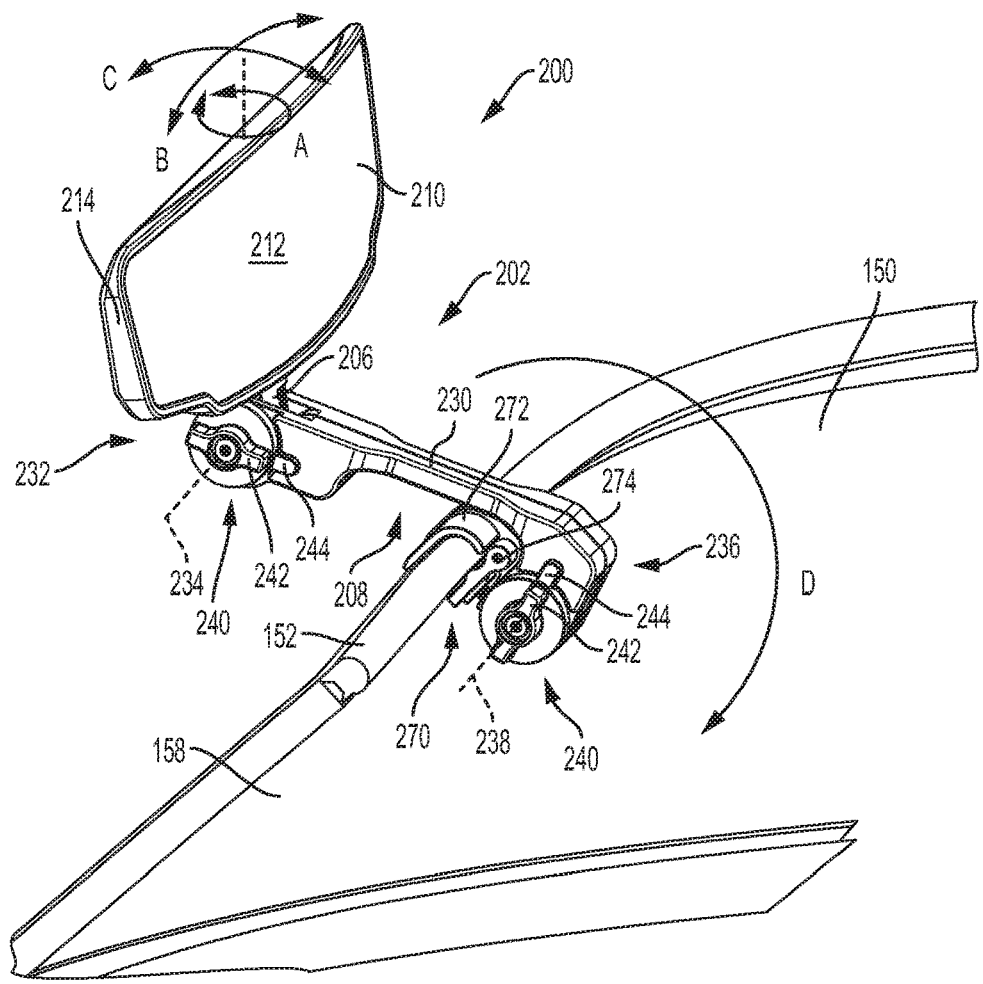
FIG. 9 is a perspective view of the aft side of the adjustable mirror assembly shown in FIG. 5 in a raised position.
Figure 10:
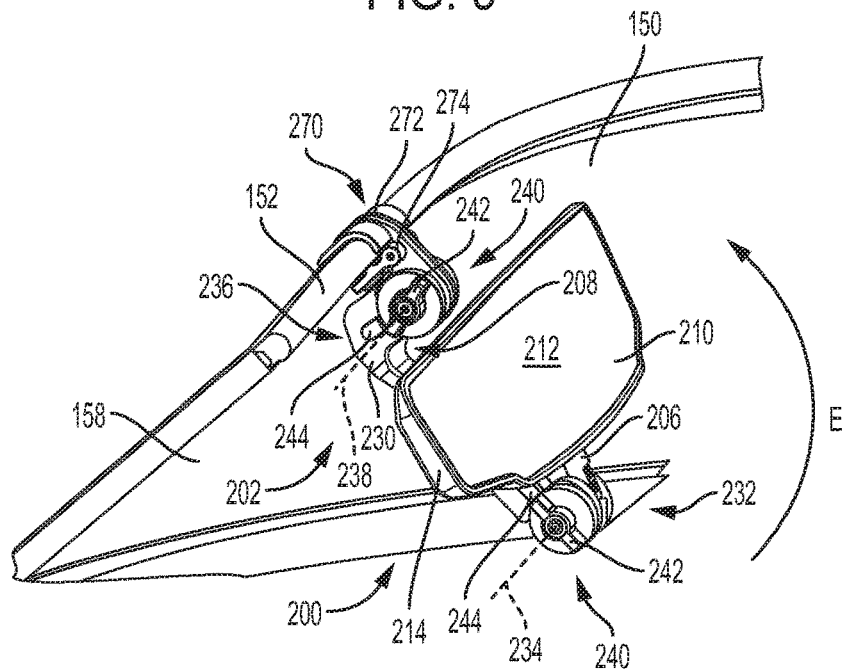
FIG. 10 is a perspective view of the aft side of the adjustable mirror assembly shown in FIG. 5 in a lowered position.
Figure 11:
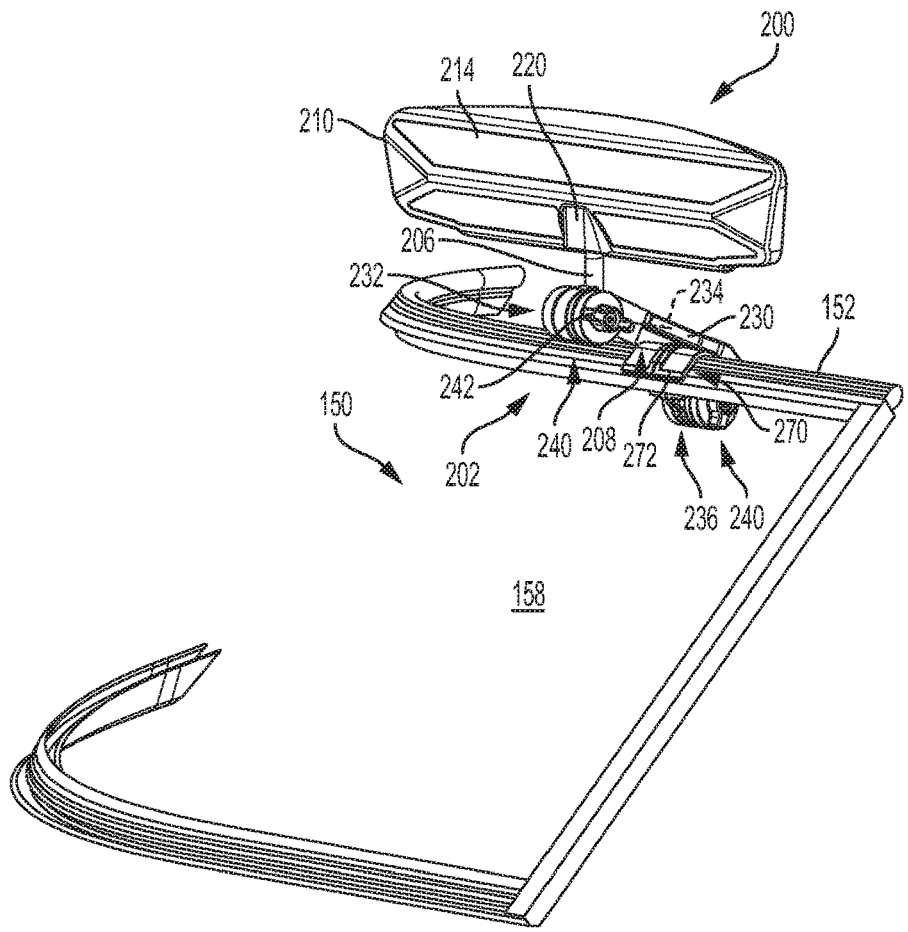
FIG. 11 is a perspective view of the forward side of the adjustable mirror assembly shown in FIG. 5 in the raised position.
Figure 12:
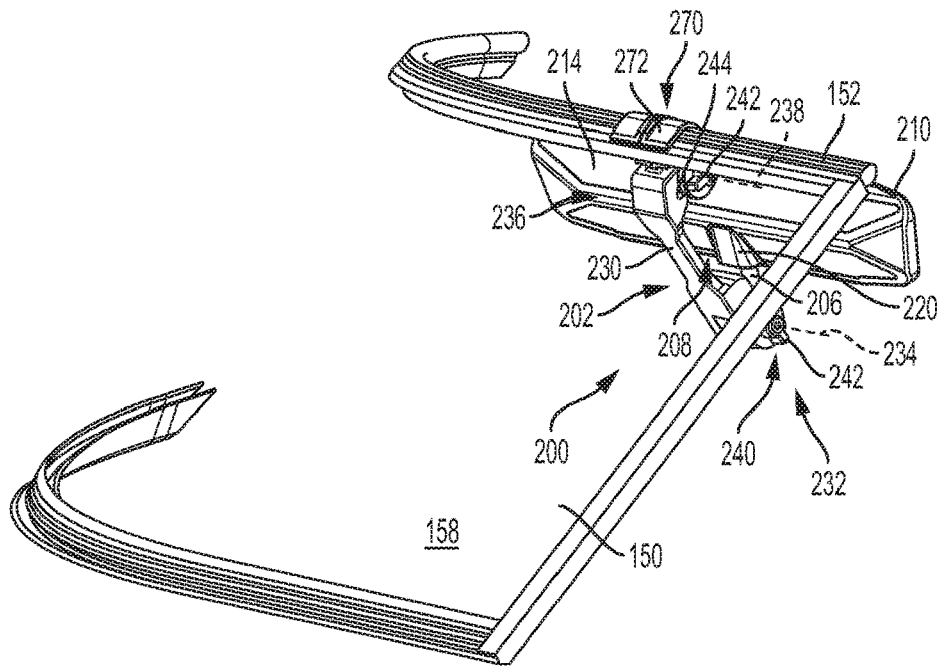
FIG. 12 is a perspective view of the forward side of the adjustable mirror assembly shown in FIG. 5 in the lowered position.
Figure 13:
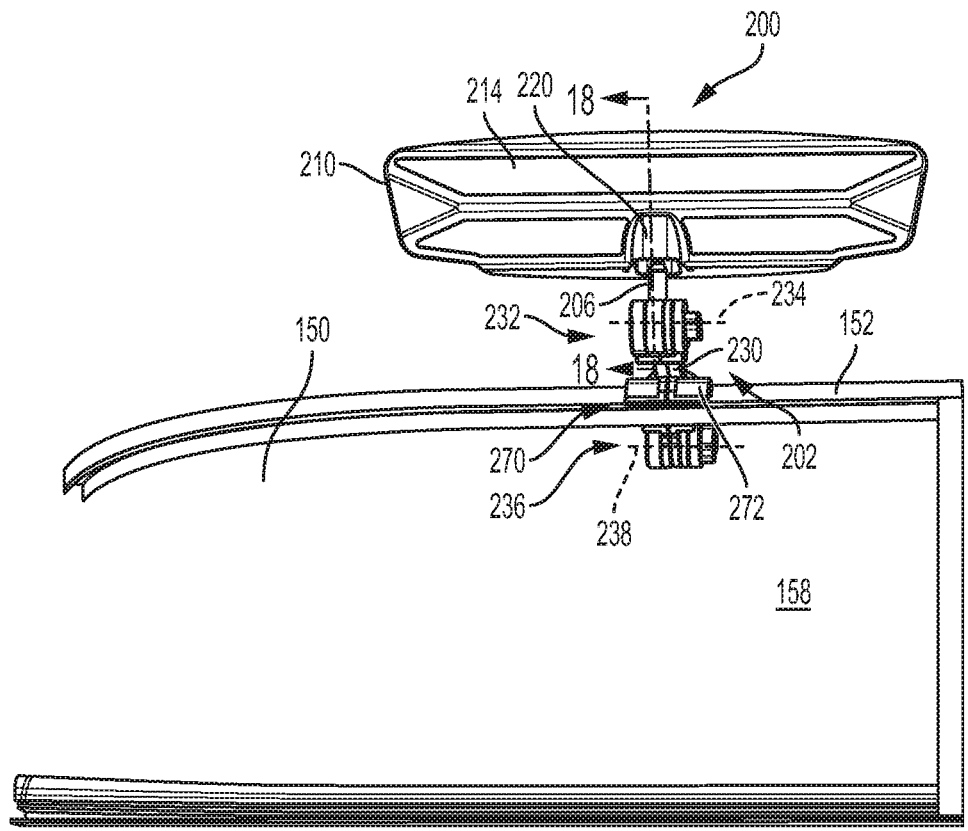
FIG. 13 is a view taken from a bow seating area of the boat looking aft with the adjustable mirror assembly shown in FIG. 5 in the raised position.
Figure 14:
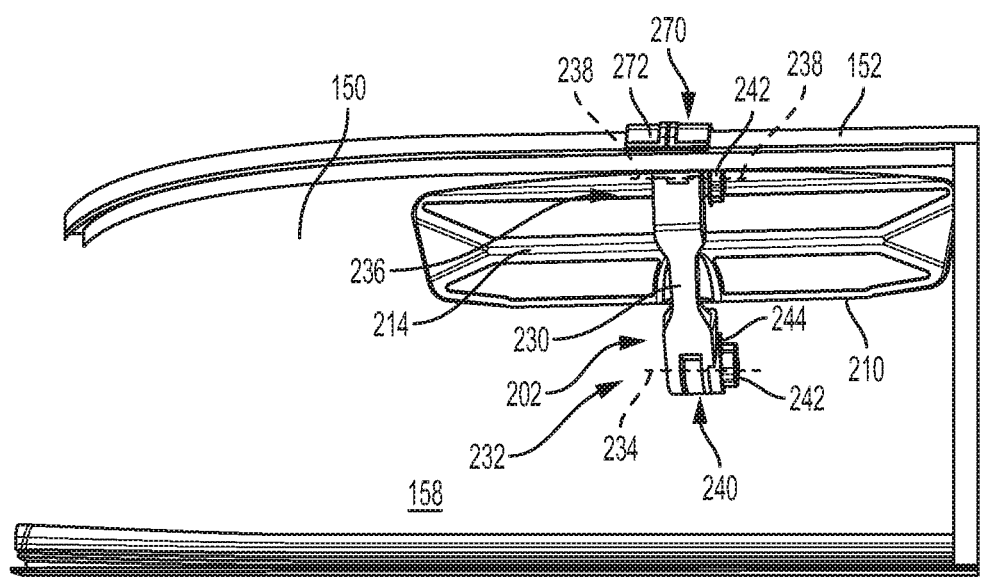
FIG. 14 is a view taken from a bow seating area of the boat looking aft with the adjustable mirror assembly shown in FIG. 5 in the lowered position.
Figure 15:
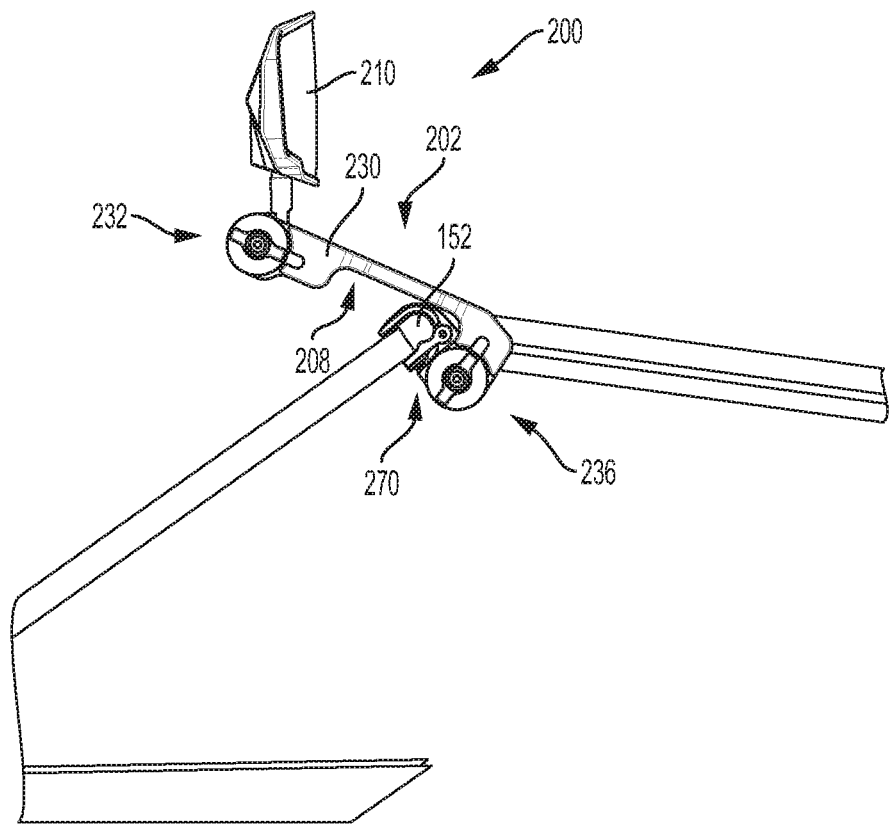
FIG. 15 is a side view of the adjustable mirror assembly shown in FIG. 5 in the raised position.
Figure 16:
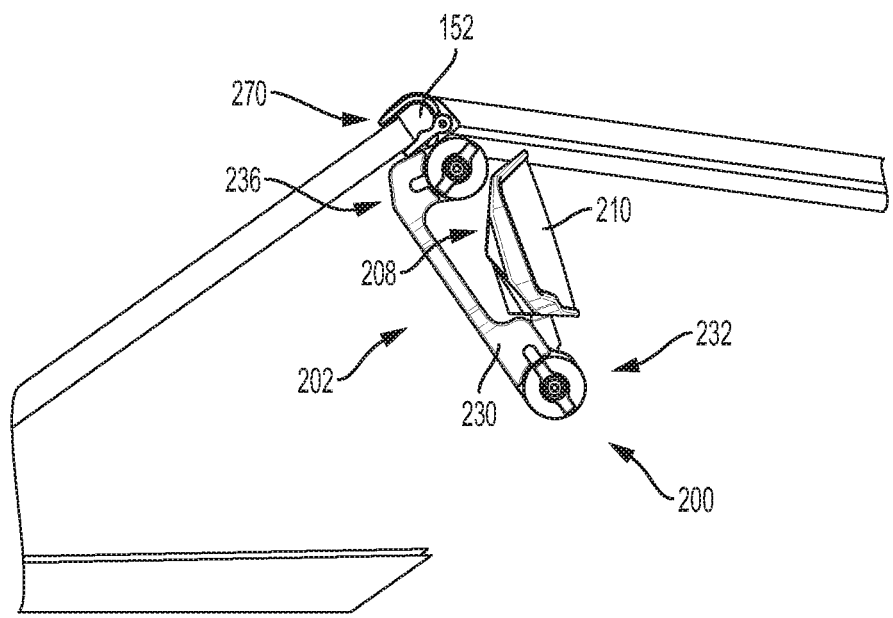
FIG. 16 is a side view of the adjustable mirror assembly shown in FIG. 5 in the lowered position.

The adjustable mirror assembly 200 is movable between raised and lowered positions. FIGS. 5 and 6 show the adjustable mirror assembly 200 in the raised position, and FIGS. 7 and 8 show the adjustable mirror assembly 200 in the lowered position. FIGS. 5 and 7 are perspective views showing the aft side of the adjustable mirror assembly 200, and FIGS. 6 and 8 are perspective views showing forward side of the adjustable mirror assembly 200. The adjustable mirror assembly 200 is shown mounted to the upper edge 152 of the windshield 150 in FIGS. 9-16. FIGS. 9, 11, 13, and 15 show the adjustable mirror assembly 200 in a raised position, and FIGS. 10, 12, 14, and 16 show the adjustable mirror assembly 200 in a lowered position. FIGS. 9 and 10 are perspective views showing the aft side of the adjustable mirror assembly 200, and FIGS. 11 and 12 are perspective views showing the forward side of the adjustable mirror assembly 200. FIGS. 13 and 14 are views taken from the bow seating area 132 looking aft at the starboard-side portion 158 of the windshield 150. FIGS. 15 and 16 are side views of the adjustable mirror assembly 200.

The adjustable mirror assembly 200 includes a mirror 210, a support 202, and mounting structure 270. The support 202 includes a main body 230 having a mirror end 232 and a mounting structure end 236.

The mirror 210 includes a reflective surface 212. The reflective surface 212 may be any suitable mirror material known in the art. In this embodiment, the reflective surface 212 of the mirror 210 is convex, but it may have any suitable shape including a concave shape or a flat surface. The reflective surface 212 of this embodiment is convex in both the vertical and horizontal (width direction of the mirror 210) with the same radius (40 inches) in both directions. The reflective surface 212 may have any size, but the reflective surface 212 preferably has a large surface area to provide for a wide field of view, particularly in the width direction of the reflective surface 212. For example, the reflective surface 212 may be 19 inches wide and 4.75 inches tall. Preferably the mirror 210 is sized and positioned on the windshield 150 to give the driver a full view of a watersports participant behind the boat 100. In water skiing and wakeboarding applications, for example, the mirror preferably provides for a wide field of view to observe the watersports participant that is a large distance from the centerline 102 of the boat 100 and moving quickly from one side to the other, such as a slalom skier that moves between buoys that are more than 38 feet from the centerline 102 of the boat 100. The convex shape of reflective surface 212 helps provide for a wide field of view while minimizing the overall size of the reflective surface 212.

Figure 17:
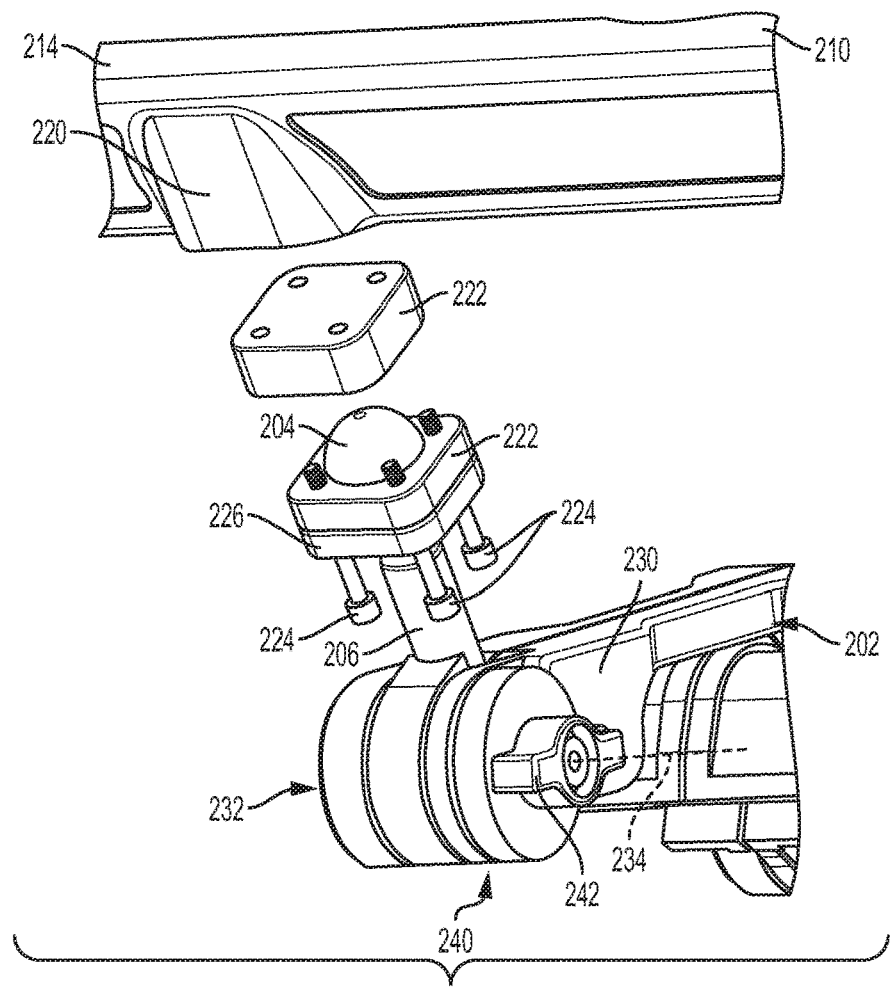
FIG. 17 is an exploded view of a portion of the adjustable mirror assembly shown in FIG. 5.
Figure 18:
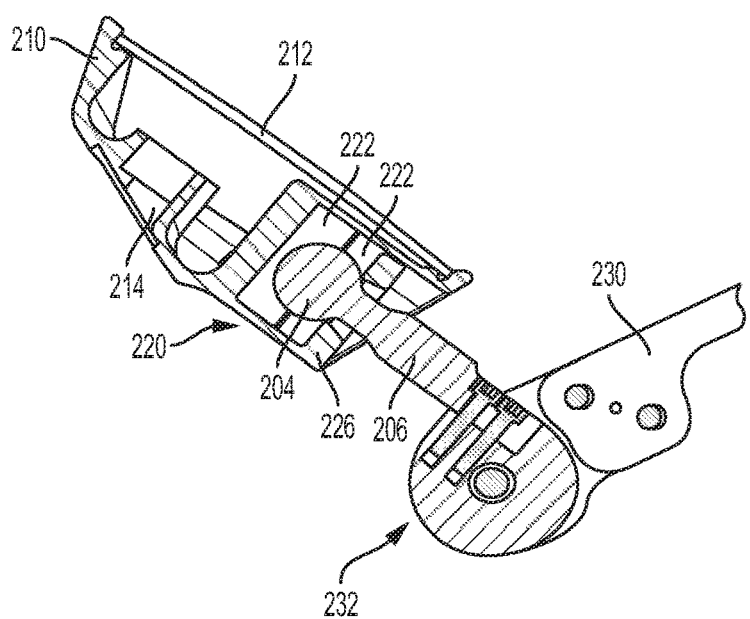
FIG. 18 is a cross-sectional view taken along section line 18-18 in FIG. 13 of a portion of the adjustable mirror assembly shown in FIG. 5.

The mirror 210 may be connected to the support 202 using any suitable method. In this embodiment, the mirror 210 is connected to the support 202 with a ball-and-socket joint. FIG. 17 is an exploded view of the ball-and-socket joint and FIG. 18 is a cross-sectional view of the ball-and-socket joint taken along section line 18-18 in FIG. 13. The mirror 210 of this embodiment includes a housing 214 which houses the reflective surface 212 and a socket 220. The socket 220 is designed to accept a ball 204 of the support 202. The ball 204 located on the end of a rod 206. The ball 204 is compressed between two pressure plates 222. Although any suitable means may be used to compress the ball 204, in this embodiment four bolts 224 engage with the housing 214 to tighten a bottom plate 226 and compress the ball 204. The pressure on the ball 204 in the socket 220 is adjustable by the changing torque on the bolts 224. Preferably, the materials selected for the contact surfaces between the pressure plates 222 and the ball 204 provide a high static friction and a low kinetic friction. In this embodiment, the pressure plates 222 are made of a material different from the ball 204. The ball 204 of this preferred embodiment is aluminum, and the pressure plates 222 are a polymer such as an acetal (e.g., Delrin® sold by E. I. du Pont de Nemours and Company). The polymer pressure plates 222 provides for relatively low kinetic friction between the ball 204 and the pressure plates 222, allowing a user to easily, simply, and quickly adjust the position of the mirror using his or her hand. Yet, at the same time, the load on the bolts 224 can be set high enough that the mirror 210 does not move from the position set by the user during normal operation of the boat 100 because of a relatively high static friction. The ball-and-socket joint of this embodiment, and the other joints of the adjustable mirror assembly 200, are designed to be secure even in view of the high loads, such as 6G+ loads, that the boat 100 may encounter.

Unlike other joints that may use threaded fasteners to secure the mirror 210 in place, the ball-and-socket joint allows for simple and easy adjustment of the mirror 210. As discussed above, a user can simply grab the mirror 210 with his or her hand to adjust it. For example, a user does not have to unthread a fastener to adjust the orientation of the mirror 210. The ball-and-socket joint of this embodiment allows the mirror to rotate a full 360 degrees in a generally horizontal direction, direction A (see FIG. 9). Direction A is in a plane perpendicular to an axis of the rod 206. In this embodiment, the mirror 210 may also be tilted by ±15 degrees in any direction perpendicular to an axis of the rod 206, for example, by ±15 degrees in the port and starboard direction (direction B) and also ±15 degrees in the fore and aft direction (direction C), but the joint may be designed to allow for any suitable range of motion. In this embodiment, the mirror 210 is continuously adjustable over its range of travel in directions A, B, and C, as opposed to adjustable to a finite number of discrete positions.

The rod 206, and thus the mirror 210, is rotatable about a first axis 234 on the mirror end 232 of the main body 230. In this embodiment, the rod 206 rotates 225 degrees about the first axis 234. The rotation of the rod 206 allows the mirror 210 to move from the raised position to the lowered position, as will be discussed further below. A locking mechanism 240 is used to lock the rod 206 in the desired orientation. Although the locking mechanism 240 may be designed to be continuously adjustable and lock the rod 206 at any position over its range of travel, the locking mechanism 240 of this embodiment locks the rod 206 in a finite number of discrete positions. Although any suitable number of positions may be used, the locking mechanism 240 of this embodiment locks the rod 206 in one of two discrete positions, one corresponding to the raised position of the adjustable mirror assembly 200 and another corresponding to the lowered position of the adjustable mirror assembly 200. Having discrete positions, as opposed to continuous positions over the range of travel of the rod 206, enables the use of a locking mechanism 240 that securely and rigidly withstands the operating loads of the boat 100 and enables the use of a locking mechanism having quick and simple operation. Here, the locking mechanism 240 used can be operated with a small twist of a knob 242 or the press of a button 244 (as will be discussed below), as opposed to, for example, torquing down a threaded fastener, either with a tool or by hand, to secure the joint.

Figure 19:
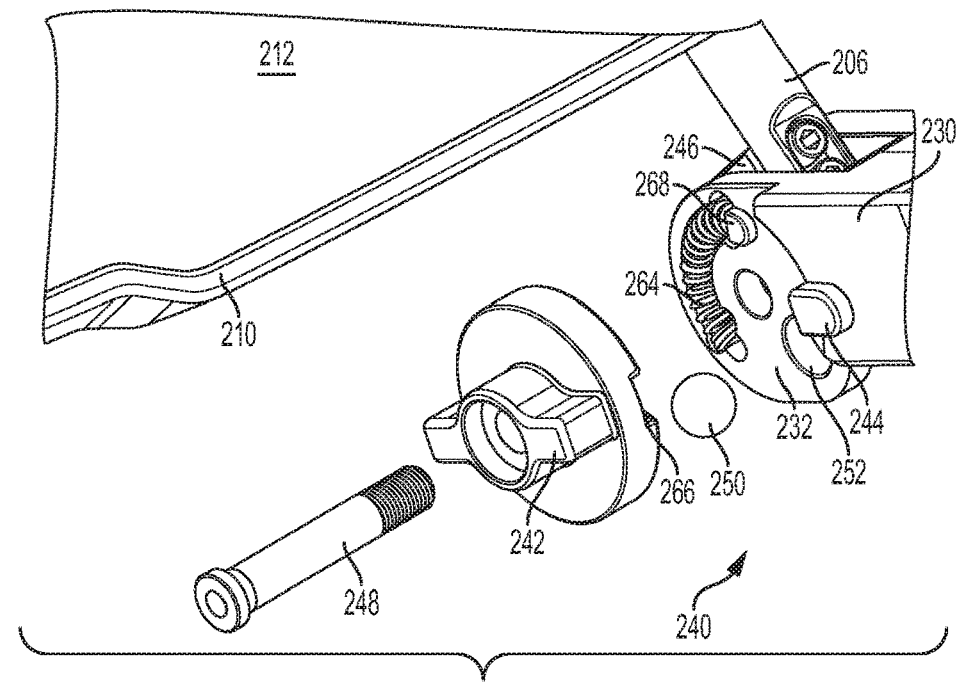
FIG. 19 is an exploded perspective view from the aft and port side of a locking mechanism used in the adjustable mirror assembly shown in FIG. 5.
Figure 20:
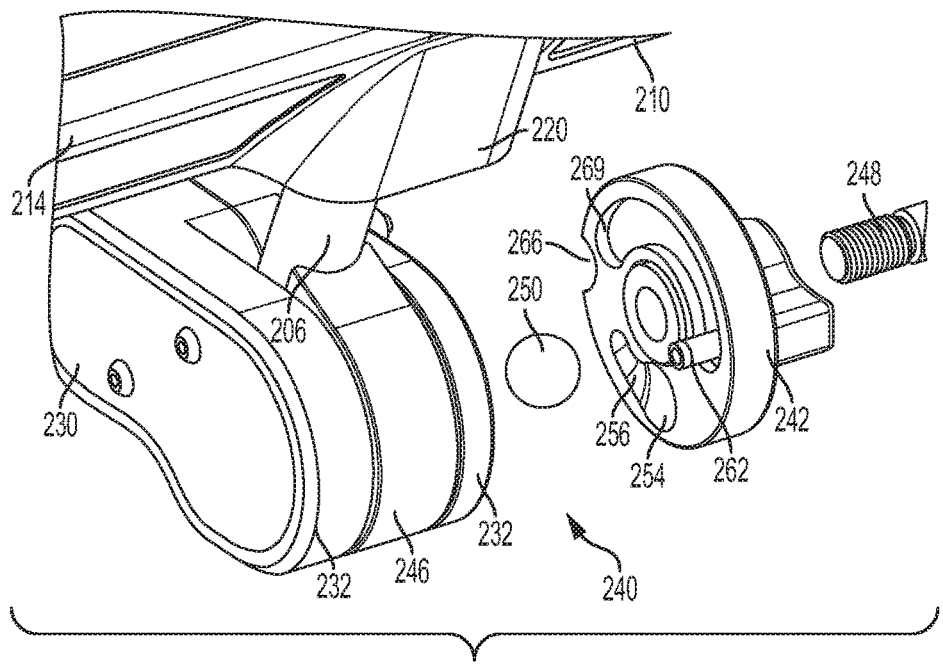
FIG. 20 is an exploded perspective view from the starboard and forward side of the locking mechanism shown in FIG. 19.

Although any suitable locking mechanism 240 may be used, the locking mechanism 240 the locking mechanism of this embodiment will be described further below with reference to FIGS. 19 and 20. FIGS. 19 and 20 are exploded views of the locking mechanism 240 at the mirror end 232 of the main body 230. FIG. 19 is an exploded perspective view from the aft and port side of the locking mechanism 240, FIG. 20 is an exploded perspective view from the starboard and forward side of the locking mechanism 240. The rod 206 has a swivel mount 246 on the end of the rod 206 opposite the ball 204. The swivel mount 246, mirror end 232 of the main body 230, and knob 242 are held together by a bolt 248. The bolt 248 forms the first axis 234 about which the swivel mount 246, and thus the rod 206 and mirror 210, rotate.

The locking mechanism 240 includes a ball 250 that is located in a through-hole 252 formed in the mirror end 232 of the main body 230. Throughout the operation of the locking mechanism 240, as will be discussed below, the ball 250 is retained in the through-hole 252. The ball 250 is in contact with both the knob 242 and the swivel mount 246.

Figure 21:
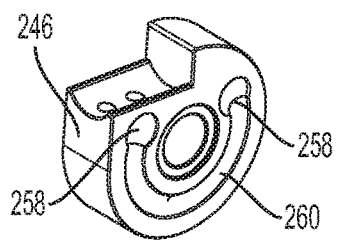
FIG. 21 is a perspective view of a component of a support used with the locking mechanism shown in FIG. 19.

Although the ball 250 may be made of any suitable material, the ball 250 of this embodiment is a material having a high static friction and a low kinetic friction, such as, for example, a polymer such as an acetal (e.g., Delrin® sold by E. I. du Pont de Nemours and Company), like that used for the pressure plates 222 discussed above. Many of the other components of the adjustable mirror assembly 200, including those in contact with the ball, may be made from any suitable material such as aluminum. The knob 242 includes a hemispherical detent 254 and a groove 256 connected to the detent 254. The depth of this groove 256 becomes shallower moving in a direction from the detent 254 to the end of the groove 256 and will be referred to herein as a ramp. The swivel mount 246 also includes two detents 258 as can be seen in FIG. 21, which is a perspective view of the swivel mount 246. One of these detents 258 corresponds to the raised position, and the other detent 258 corresponds to the lowered position. Providing additional detents 258 on the swivel mount 246 would enable additional discrete positions.

When the locking mechanism 240 is in its unlocked position, the ball 250 is located within the detent 254 of the knob 242, the through-hole 252, and one of the detents 258 on the swivel mount 246. A gap is formed between the ball 250 and the knob 242 and swivel mount 246, allowing the swivel mount 246 to freely rotate between its raised and lowered positions. As the swivel mount 246 rotates, the ball 250 rides along a groove 260 formed in the swivel mount 246 and connecting the detents 258.

The locking mechanism 240 is locked by twisting the knob 242. In this embodiment, the knob 242 is designed to be rotated about one eighth of a turn clockwise to lock the locking mechanism 240. As the knob 242 is rotated, the ball 250 moves from the detent 254 on the knob 242 into the ramp 256. Because the ramp 256 is progressively shallower, the gap between the ball 250 and the knob 242 and swivel mount 246 is eliminated as the knob 242 is rotated. At the end of the travel of the knob 242, the ball 250 is pressed firmly into the detent 258 on the swivel mount 246. The detents 258 on the swivel mount 246 have a hemispherical shape to securely, tightly, and rigidly hold the swivel mount 246, and thus the rod 206 and mirror 210, in position. As the knob 242 is rotated, a pin 262 compresses a spring 264.

When the knob 242 is rotated to the locked position, a portion of the release button 244 engages with a pocket 266 machined into the knob 242. The release button 244 is biased by a spring (not shown) in an outward direction to engage the release button 244 with the pocket 266 and hold the knob 242 in the locked position. The groove 260 on the swivel mount 246 is shallower than the detents 258. As a result, if the knob 242 is rotated when the mirror 210 is in a position other than the raised position or lowered position, the gap between the ball 250 and the knob 242 and swivel mount 246 is eliminated, which prevents further rotation of the knob 242. In this case, the rotation of the knob 242 is stopped before the release button 244 can be engaged with the pocket 266 on the knob 242. The relative depth of the groove 260 on the swivel mount 246, as compared to the detents 258 on the swivel mount 246, prevents the locking mechanism 240 from being locked in a position other than the raised or lowered position.

Providing two detents 258 at the end of the range of travel for the swivel mount 246 helps improve durability of the locking mechanism by minimizing the likelihood that a user would try to lock the locking mechanism 240 in a position other than one of the discrete positions. Damage could occur to the ball 250 (particularly when the ball is made from a polymer such as Delrin®) from repeated attempts to lock the locking mechanism when the ball 250 is in the groove 260, as opposed to one of the detents 258. Suitable physical limitations on rotation (or other tactile indications that coincide with positioning the ball 250 in the detent 258) indicate to the user that the swivel mount 246 has been positioned in one of the discrete positions, and further indicate to the user that it is appropriate to lock the locking mechanism 240.

A user presses the release button 244 to release the locking mechanism 240. When the user presses the release button 244, the release button 244 disengages from the pocket 266 and the spring 264 pushes against the pin 262, causing the knob 242 to rotate to the unlocked position, which in this embodiment is about one eighth of a turn counter-clockwise. The spring 264 helps to ensure that the knob 242, and thus the locking mechanism 240, is completely moved to the unlocked position. Ensuring that the locking mechanism 240 is completely unlocked avoids a false sense that the mechanism is unlocked, which could result in damage to the locking mechanism 240 if a user tried to move the rod 206 with the locking mechanism 240 not fully unlocked. A boss 268 contacts the end of another groove 269 formed in the knob 242 to limit the travel of the knob 242 in the counter-clockwise direction and position the knob 242 in the unlocked position. With the locking mechanism 240 in the unlocked position, the rod 206 is free to rotate about the first axis 234, as discussed above.

As discussed above and shown in FIGS. 9-16, the adjustable mirror assembly 200 is preferably mounted to the windshield 150. Any suitable mounting structure may be used to connect or mount the adjustable mirror assembly 200 to the windshield 150. In this embodiment, the adjustable mirror assembly 200 is mounted to the upper edge 152 of the windshield 150. The mounting structure 270 of this embodiment is a clamp in which the upper edge 152 of the windshield 150 is pressed between a fixed jaw 272 and a movable jaw 274.

The main body 230 is rotatably connected to the mounting structure 270 on the mounting structure end 236 of the main body 230, allowing the main body 230 to rotate between a raised position and a lowered position. In this embodiment, the main body 230 rotates 205 degrees about the second axis 238.

In this embodiment, a raised position is a position in which the mirror 210 (and preferably also the mirror end 232 of the main body 230) is raised above the level of the upper edge 152 of the windshield 150. In the raised position shown in FIGS. 9, 11, 13, and 15, the main body 230 extends forward from the upper edge 152 of the windshield 150 and forward over the starboard-side portion 158 of the windshield 150. The mirror thus is positioned higher than the upper edge 152 of the windshield 150 (see, e.g., FIGS. 13 and 15), forward of the upper edge 152 of the windshield 150, and above the starboard-side portion 158 of the windshield 150. Once positioned by the user, a locking mechanism 240 is used to lock the main body 230 in the raised or lowered position. In this embodiment, the locking mechanism 240 is the same as discussed above to lock the rod 206, and thus the same reference numerals are used to indicate these features and a discussion of the locking mechanism 240 is omitted here.

The adjustable mirror assembly 200, including the main body 230, is movable from the raised position shown in FIGS. 9, 11, 13, and 15 to the lowered position shown in FIGS. 10, 12, 14, and 16 as follows. The user presses the release button 244 of the locking mechanism 240 on the mounting structure end 236 of the main body 230. This allows the main body 230 to freely rotate about the second axis 238. The user also presses the release button 244 of the locking mechanism 240 on the mirror end 232 of the main body 230. This allows the rod 206 to freely rotate about the first axis 234. The user then rotates, such as by holding onto the mirror 210, the main body 230 in direction D about the second axis 238 to a lowered position (see FIG. 9) and the mirror 210 about the first axis 234 in direction E to a position in which the reflective surface 212 is aft-facing (see FIG. 10). In this embodiment, the lowered position is a position in which the mirror 210 (and preferably also the mirror end 232 of the main body 230) is lower than the level of the upper edge 152 of the windshield 150. Once the main body 230 and mirror 210 are moved to the lowered position, the user rotates the knob 242 on the mounting structure end 236 of the main body 230 to lock the main body 230 in position and rotates the knob 242 on the mirror end 232 of the main body 230 to lock the mirror 210 in position. The process is reversed to move the adjustable mirror assembly 200 from the lowered position to the raised position.

A benefit of the adjustable mirror assembly 200 is that the mirror 210 may be used to observe behind the boat 100 when it is in either the raised position or the lowered position. The main body 230 of this embodiment includes a concave portion 208, and in this embodiment, the main body 230 has a u-shape. This concave portion 208 is preferably sized large enough to accommodate the combined height of the mirror 210 and rod 206, allowing the mirror 210 to rotate farther in direction E before contacting the main body 230. The concave portion 208 helps enable the reflective surface 212 to be aft-facing in the lowered position as can be seen in FIG. 16. In this position, at least a portion of the housing 214 is located in the concave portion 208. The concave portion 208 also helps position the adjustable mirror assembly 200 in the raised position by allowing the main body 230 to move farther in a direction opposite to direction D before the main body 230 contacts the upper edge 152 of the windshield 150, as can be seen in FIG. 15.

In the lowered position, the main body 230, and thus the mirror 210, is located aft of the windshield 150 and lower than the upper edge 152 of the windshield 150 (see, e.g., FIGS. 14 and 16). In this embodiment, the mirror 210 is located above the instrumentation and displays of the dash 144, conveniently allowing the driver of the boat 100 to look both aft and at the instrumentation and displays without much movement of his or her head and eyes. The mirror 210 is also preferably located above and, more preferably, forward of the steering wheel to avoid protruding into the driver's space.

The lowered positions of the mirror 210 are particularly useful when the boat 100 has a high angle of attack, where the bow 112 is pitched up. A boat 100 may have a high angle of attack for watersports such as wake surfing where the stern of the boat 100 is heavily loaded and low in the water. When the boat 100 has a high angle of attack, the driver often stands or sits on the driver seat booster 106 in its raised position in order to look over the top of the windshield 150. If the driver were to look through the windshield 150, the pitched-up bow 112 would obstruct a portion of the driver's view. Mirrors 210 that are configured to be located only higher than the upper edge 152 of the windshield 150 thus obstruct the view of the driver when the boat 100 has a high angle of attack. In the lowered positions, the adjustable mirror assembly 200 of this embodiment allows the driver to observe aft of the boat 100 without any interference with his or her view forward.

Even in the raised position, the adjustable mirror assembly 200 minimizes potential obstruction of the driver's view with a high angle of attack. In the raised position shown in FIGS. 5, 7, 9, 11, and 13, the mirror 210 is located above the upper edge 152 of the windshield 150 and preferably forward of the upper edge 152. This moves the mirror 210 farther from the face of the operator, reducing the area of view obstructed by the mirror 210 even for relatively large mirrors, such as the one used discussed herein.

So that the driver's body minimizes obstructing the view in the mirror 210 when the adjustable mirror assembly 200 is in a lowered position, the adjustable mirror assembly 200 is preferably offset from the centerline 102 of the control console 142 when located on the starboard-side portion 158 of the windshield 150. However, the adjustable mirror assembly 200 may be located on any suitable portion of the windshield 150 preferably between a port-most portion of the windshield 150 and a starboard-most portion of the windshield 150, such as the walk-through door 154 (see FIGS. 22 and 23) or the port-side portion of the windshield 150 (see FIG. 4). When located on the walk-through door 154 (as shown in FIGS. 22 and 23), the adjustable mirror assembly 200 described herein not only allows the reflective surface 212 to be aft-facing when the walk-through door 154 is closed, but also when the walk-through door 154 is open. The position that is the lowered position of the adjustable mirror assembly 200 when the walk-through door 154 is closed (see FIG. 22) becomes a raised position when the walk-through door 154 is open (see FIG. 23), and the adjustable mirror assembly 200 can be adjusted, using the features discussed above, to provide an aft-facing view even when the walk-through door 154 is open.

Figure 24:
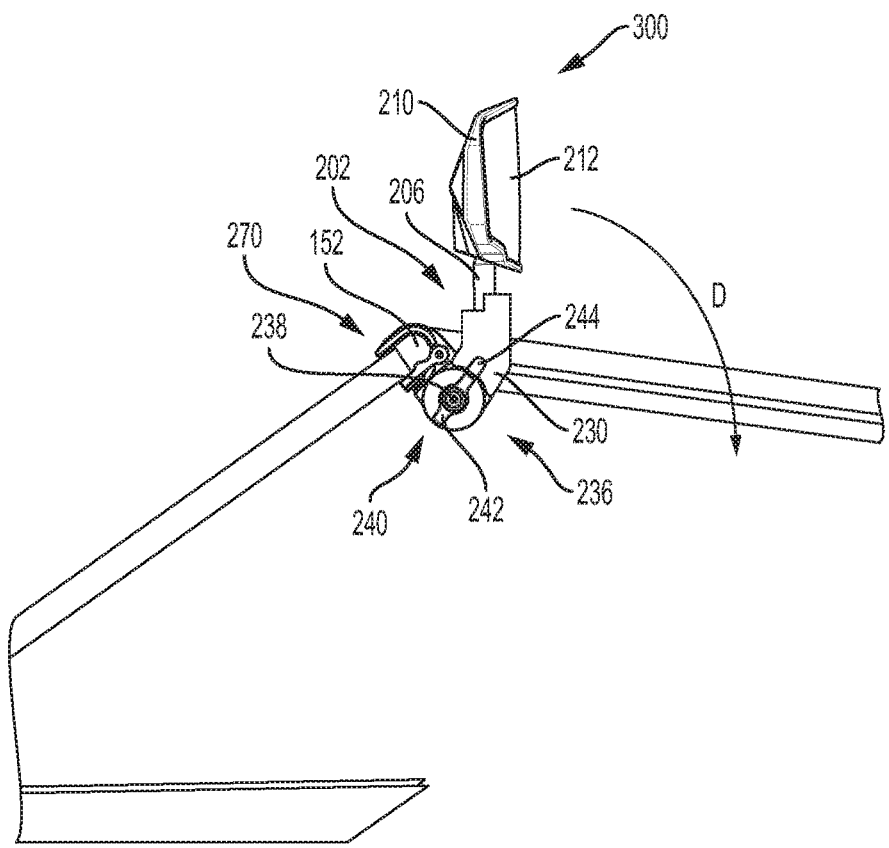
FIG. 24 is a side view of the adjustable mirror assembly according to another preferred embodiment of the invention in the raised position.
Figure 25:
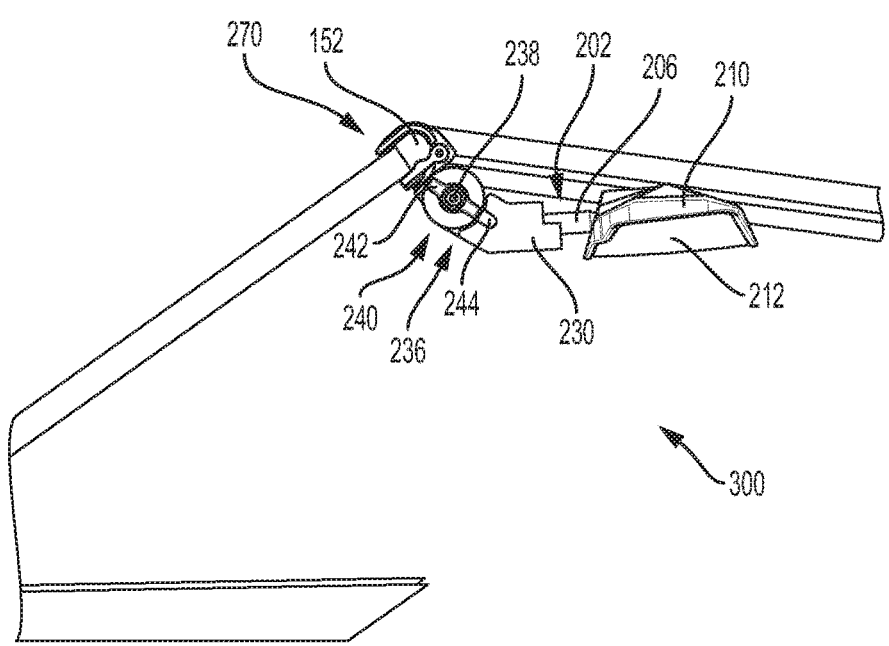
FIG. 25 is a side view of the adjustable mirror assembly shown in FIG. 24 in the lowered position.

FIGS. 24 and 25 show another preferred embodiment of the adjustable mirror assembly 300. As discussed above, the adjustable mirror assembly 200 of the previous embodiment has two pivot axes 234, 238, enabling the reflective surface 212 to be aft-facing in both the raised and lowered positions. The advantageous features of the locking mechanism 240 disclosed above, however, may also be utilized in an adjustable mirror assembly that does not face aft in both its raised and lowered positions. The reflective surface 212 of the adjustable mirror assembly 300 of this embodiment is aft-facing in only one of its raised and lowered positions. The adjustable mirror assembly 300 of this embodiment has many of the same features as the adjustable mirror assembly 200 of the previous embodiment. The same reference numerals will be used in this embodiment to refer to the same or similar components as in the previous embodiment and a detailed description of these components will be omitted. For example, the mirror 210 is connected to the support 202 with a ball-and-socket joint as shown and described above with reference to FIGS. 17 and 18.

FIG. 24 shows the adjustable minor assembly 300 of this embodiment in the raised position, and FIG. 25 shows the adjustable mirror assembly 300 of this embodiment in the lowered position. Like the previous embodiment, the main body 230 has a mounting structure end 236 that is pivotable about the second axis 238, but instead of the rod 206 being pivotably connected to the main body 230, the rod 206 is rigidly affixed to the main body 230 such that the rod 206 extends in a generally vertical direction when in the raised position. In the raised position, the reflective surface 212 is aft-facing. As described above, the minor 210 may obstruct the view of driver in the raised position under certain operating conditions. The adjustable mirror assembly 300 of this embodiment is thus movable to a lowered position where the minor 210 minimizes the obstruction to the driver's view. In this embodiment, the minor 210 is rotatable about the second axis 238 over a range of travel to a position that is preferably lower than the level of the upper edge 152 of the windshield 150 and higher than a position where minor 210 contacts, or otherwise interferes with, the steering wheel. In the lowered position, the minor 210 may be pointed aft and may be preferably rotated downward from the raised position by 90 degrees to 115 degrees.

The adjustable minor assembly 300 of this embodiment is movable from the raised position, shown in FIG. 24, to the lowered position, shown in FIG. 25, as follows. The user presses the release button 244 of the locking mechanism 240 on the mounting structure end 236 of the main body 230. This allows the main body 230 and the rod 206 and the mirror 210 to freely rotate about the second axis 238. The user then rotates, such as by holding onto the mirror 210, the main body 230 in direction D about the second axis 238 to a lowered position. As in the previous embodiment, the lowered position is a position in which the minor 210 is lower than the level of the upper edge 152 of the windshield 150. Once the main body 230 and the minor 210 are moved to the lowered position, the user rotates the knob 242 on the mounting structure end 236 of the main body 230 to lock the main body 230 in position. The process is reversed to move the adjustable mirror assembly 200 from the lowered position to the raised position.

The locking mechanism 240 of the embodiments discussed herein allows the rod 206 or the main body 230 to be located at a finite number of discrete positions. However, other suitable locking mechanisms 240 may be used to position the rod 206 or the main body 230 at any position within its respective range of travel. Although the adjustable mirror assembly 200 has been discussed herein as preferably mounted to the windshield 150, it is not so limited and may be mounted to other suitable portions of the boat 100. In addition, features, such as the locking mechanism 240 discussed herein and/or the combination of the locking mechanism 240 and ball-and-socket joint connecting the mirror 210 with the support 202, may be variously implemented in other orientations and components.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A boat with an adjustable mirror assembly, the boat comprising:
   a hull having a port side and a starboard side;
   a windshield, at least a part of which is oriented in a transverse direction of the boat, the windshield having an upper edge; and
   an adjustable mirror assembly mounted to the windshield, the adjustable mirror assembly including:
      a movable support pivotable about a first pivot axis between a lowered position and a raised position; and
      a mirror having a reflective surface, the mirror being pivotally mounted to the movable support and configured to pivot about a second pivot axis to orient the reflective surface of the mirror in an aft-facing direction in both the lowered position and the raised position, wherein, in the lowered position, the mirror is located lower than the upper edge of the windshield, aft of the windshield, and between a port-most portion of the windshield and a starboard-most portion of the windshield, and wherein, in the raised position, the mirror is located higher than the upper edge of the windshield.

2. The boat according to claim 1, wherein the adjustable mirror assembly is mounted to an upper portion of the windshield.

3. The boat according to claim 2, wherein the adjustable mirror assembly is mounted to an upper edge of the windshield.

4. The boat according to claim 3, wherein the windshield is sloped up in an aft-ward direction of the boat.

5. The boat according to claim 3, wherein, in the raised position, the mirror is located forward of the upper edge of the windshield.

6. The boat according to claim 1, further comprising a control console, a portion of the windshield being located above the control console and the adjustable mirror assembly being mounted to the portion of the windshield above the control console.

7. The boat according to claim 6, wherein, the control console includes a steering wheel and, in the lowered position, the mirror is located forward of the steering wheel.

8. The boat according to claim 1, wherein the windshield includes a walk-through door and the adjustable mirror assembly is mounted to the walk-through door.

9. The boat according to claim 1, wherein the adjustable mirror assembly includes a locking mechanism configured to lock the movable support in at least one of the raised and lowered positions.

10. The boat according to claim 1, wherein the adjustable mirror assembly includes a locking mechanism configured to lock the mirror with the reflective surface facing aft such that the mirror is prevented from pivoting about the second pivot axis.

11. The boat according to claim 1, wherein the movable support includes a concave portion.

12. The boat according to claim 11, wherein, in the lowered position, a portion of the mirror is located in the concave portion.

13. The boat according to claim 1, wherein the adjustable mirror assembly has a plurality of raised positions.

14. The boat according to claim 1, wherein the adjustable mirror assembly has a plurality of lowered positions.

15. The boat according to claim 1, wherein the mirror is connected to the movable support by a ball-and-socket joint such that the tilt of the mirror is adjustable in at least one of a fore-and-aft direction and a port-and-starboard direction.

16. The boat according to claim 15, wherein the mirror includes a housing and a socket of the ball-and-socket joint is located within the housing of the mirror.

17. A boat with an adjustable mirror assembly, the boat comprising:

a hull having a port side and a starboard side;

a windshield, at least a part of which is oriented in a transverse direction of the boat, the windshield having an upper edge; and an adjustable mirror assembly including:

a movable support pivotable about a first pivot axis;

a first locking mechanism configured to lock the movable support in one of two discrete positions such that the movable support is prevented from moving about the first pivot axis when the movable support is locked in the discrete position; and a mirror having a reflective surface.

18. The boat according to claim 17, wherein the mirror is connected to the movable support such that the tilt of the mirror is adjustable in at least one of a fore-and-aft direction and a port-and-starboard direction.

19. The boat according to claim 18, wherein the mirror is connected to the movable support by a ball-and-socket joint such that the tilt of the mirror is adjustable in at least one of the fore-and-aft direction and the port-and-starboard direction.

20. The boat according to claim 19, wherein the mirror includes a housing and a socket of the ball-and-socket joint is located within the housing of the mirror.

21. The boat according to claim 17, wherein the mirror is pivotally mounted to the movable support and configured to pivot about a second pivot axis to orient the reflective surface of the mirror in an aft-facing direction, and the adjustable mirror assembly further includes a second locking mechanism configured to lock the mirror in a finite number of discrete positions such that the mirror is prevented from pivoting about the second pivot axis.

22. The boat according to claim 17, wherein one of the discrete positions is a lowered position in which the mirror is located lower than the upper edge of the windshield, and wherein another one of the discrete positions is a raised position in which the mirror is located higher than the upper edge of the windshield.

23. The boat according to claim 22, wherein the reflective surface of the mirror is oriented in an aft-facing direction in the raised position.

* * * * *